US010528923B2

(12) United States Patent
Pinsonnault et al.

(10) Patent No.: US 10,528,923 B2
(45) Date of Patent: Jan. 7, 2020

(54) APPARATUS AND METHODS FOR ASSISTING WITH AIRCRAFT MAINTENANCE USING PREDETERMINED MAINTENANCE PROGRAMS

(71) Applicant: Bombardier Inc., Dorval (CA)

(72) Inventors: Jerome Pinsonnault, Lachine (CA); Mohammad Reza Mofakhami, Pointe-Claire (CA); Kyle R. Mulligan, Calgary (CA)

(73) Assignee: BOMBARDIER INC., Dorval (CA)

( * ) Notice: Subject to any disclaimer, the term of this patent is extended or adjusted under 35 U.S.C. 154(b) by 90 days.

(21) Appl. No.: 15/573,673

(22) PCT Filed: May 11, 2016

(86) PCT No.: PCT/IB2016/052708
§ 371 (c)(1),
(2) Date: Nov. 13, 2017

(87) PCT Pub. No.: WO2016/185323
PCT Pub. Date: Nov. 24, 2016

(65) Prior Publication Data
US 2018/0121887 A1    May 3, 2018

Related U.S. Application Data

(60) Provisional application No. 62/162,010, filed on May 15, 2015.

(51) Int. Cl.
*G06Q 10/00* (2012.01)
*G06Q 50/04* (2012.01)
(Continued)

(52) U.S. Cl.
CPC .............. *G06Q 10/20* (2013.01); *B64F 5/40* (2017.01); *G06Q 50/04* (2013.01); *G07C 5/0816* (2013.01); *Y02P 90/30* (2015.11)

(58) Field of Classification Search
CPC .......... B64F 5/40; G06Q 50/04; G07C 5/0816
(Continued)

(56) References Cited

U.S. PATENT DOCUMENTS 6,219,597 B1  4/2001  Longere
6,408,258 B1  6/2002  Richer
(Continued)

FOREIGN PATENT DOCUMENTS

EP    2722822 A2    4/2014

OTHER PUBLICATIONS

PCT international Search Report and Written Opinion dated Jun. 17, 2016 re: International Application No. PCT/IB2016/052708.
(Continued)

*Primary Examiner* — Maceeh Anwari
(74) *Attorney, Agent, or Firm* — Norton Rose Fulbright Canada LLP

(57) ABSTRACT

Apparatus and methods for assisting with maintenance and design of one or more structural elements of an aircraft are disclosed. One exemplary method comprises receiving actual utilization data for the aircraft and evaluating the actual utilization data with respect to at least one of a plurality of utilization criteria respectively associated with a plurality of utilization categories for the aircraft where the utilization categories are associated with respective predetermined maintenance programs for the structural element or for the aircraft as a whole. Based on the evaluation of the actual utilization data with respect to the at least one utilization criterion, one of the utilization categories is assigned to the aircraft. Based on the utilization category assigned to the aircraft, one of the predetermined maintenance programs is assigned to the structural element or to the aircraft as a whole.

33 Claims, 13 Drawing Sheets

(51) Int. Cl.
*B64F 5/40* (2017.01)
*G07C 5/08* (2006.01)

(58) Field of Classification Search
USPC ......................................................... 701/29.6
See application file for complete search history.

(56) References Cited

U.S. PATENT DOCUMENTS

| | | |
|---|---|---|
| 8,478,477 B2 | 7/2013 | Maisonneuve et al. |
| 2010/0023209 A1 | 1/2010 | Maisonneuve et al. |
| 2010/0292869 A1 | 11/2010 | Riley et al. |
| 2015/0051786 A1 | 2/2015 | Wang |

OTHER PUBLICATIONS

M. Reza Mofakhami et al., Structural Health Monitoring in Civil Aviation: Applications and Integration, Sep. 17, 2013, SAE International, USA.

| MAINTENANCE PROGRAM ID | MAINTENANCE PROGRAM DESCRIPTION | UTILIZATION CATEGORY ID |
|---|---|---|
| PROGRAM 1 | DESCRIPTION 1 | CATEGORY 1 |
| PROGRAM 2 | DESCRIPTION 2 | CATEGORY 2 |
| PROGRAM 3 | DESCRIPTION 3 | CATEGORY 3 |

| UTILIZATION CATEGORY ID | UTILIZATION CATEGORY DESCRIPTION | UTILIZATION CRITERIA 54 |
|---|---|---|
| CATEGORY 1 | BASELINE (BASELINE FATIGUE) | CRITERION 1 |
| CATEGORY 2 | LIGHT (INDUCES LESS FATIGUE DAMAGE THAN THE BASELINE CATEGORY) | CRITERION 2 |
| CATEGORY 3 | SUPER-LIGHT (INDUCES LESS FATIGUE DAMAGE THAN THE LIGHT CATEGORY) | CRITERION 3 |

FIG. 6

| AIRCRAFT ID 62 | ACTUAL UTILIZATION DATA 36 | UTILIZATION CATEGORY ID |
|---|---|---|
| AIRCRAFT 1 | UTILIZATION DATA 1 | CATEGORY 1 |
| AIRCRAFT 2 | UTILIZATION DATA 2 | CATEGORY 1 |
| AIRCRAFT 3 | UTILIZATION DATA 3 | CATEGORY 2 |

FIG. 7A

| AIRCRAFT ID 62 | UTILIZATION CATEGORY ID | PSE ID 60 | MAINTENANCE PROGRAM ID |
|---|---|---|---|
| AIRCRAFT 1 | CATEGORY 1 | PSE 1 | PROGRAM 1 |
| AIRCRAFT 2 | CATEGORY 1 | PSE 1 | PROGRAM 1 |
| AIRCRAFT 3 | CATEGORY 2 | PSE 1 | PROGRAM 2 |

FIG. 7B

| AIRCRAFT ID 62 | UTILIZATION CATEGORY ID | MAINTENANCE PROGRAM ID |
|---|---|---|
| AIRCRAFT 1 | CATEGORY 1 | PROGRAM 1 |
| AIRCRAFT 2 | CATEGORY 1 | PROGRAM 1 |
| AIRCRAFT 3 | CATEGORY 2 | PROGRAM 2 |

| AIRCRAFT ID 62 | UTILIZATION CATEGORY ID | RECOMMENDATION FOR KEEPING CURRENT UTILIZATION CATEGORY 59 | RECOMMENDATION FOR REPLACING CURRENT UTILIZATION CATEGORY 59 |
|---|---|---|---|
| AIRCRAFT 1 | CATEGORY 1 | RECOMMENDATION 1 | RECOMMENDATION 4 |
| AIRCRAFT 2 | CATEGORY 1 | RECOMMENDATION 2 | RECOMMENDATION 5 |
| AIRCRAFT 3 | CATEGORY 2 | RECOMMENDATION 3 | RECOMMENDATION 6 |

FIG. 8

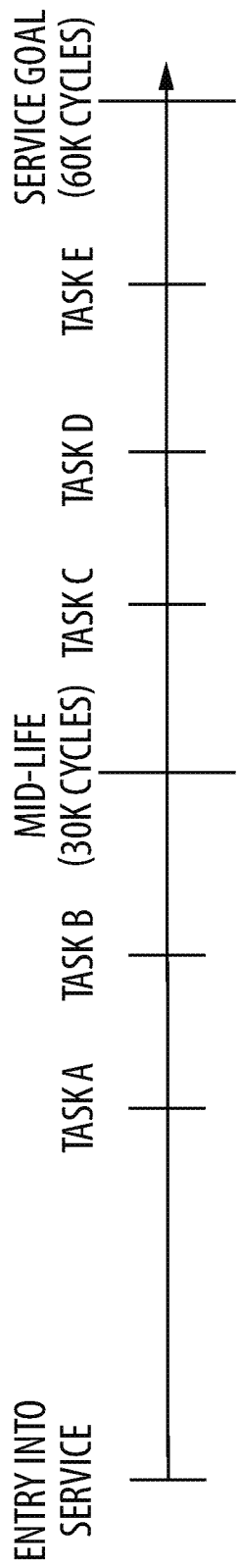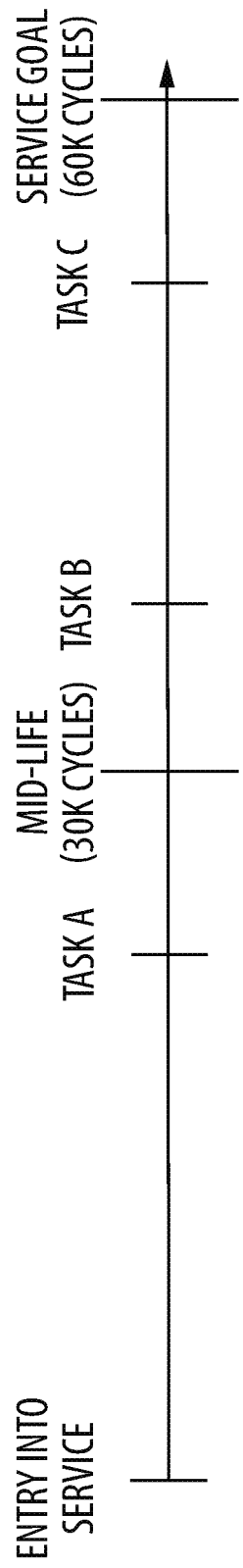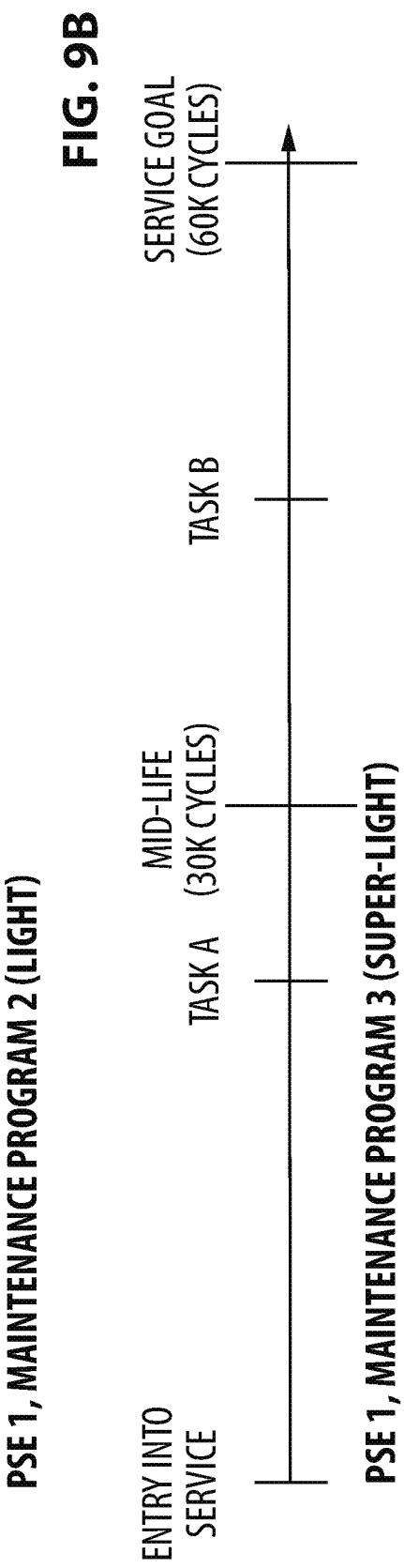

| DESIGN ASSUMPTION ID | DESIGN ASSUMPTIONS 56 | PSE ID 60 |
|---|---|---|
| ASSUMPTION 1 | DESCRIPTION 1 | PSE 1 |
| ASSUMPTION 2 | DESCRIPTION 2 | PSE 2 |
| ASSUMPTION 3 | DESCRIPTION 3 | PSE 3 |

FIG. 11

| PSE ID 60 | DESIGN ASSUMPTION ID | VALIDITY INDICATION |
|---|---|---|
| PSE 1 | ASSUMPTION 1 | TOO SEVERE |
| PSE 2 | ASSUMPTION 1 | ACCURATE |
| PSE 3 | ASSUMPTION 1 | NOT SEVERE ENOUGH |

FIG. 12

APPARATUS AND METHODS FOR ASSISTING WITH AIRCRAFT MAINTENANCE USING PREDETERMINED MAINTENANCE PROGRAMS

CROSS-REFERENCE TO RELATED APPLICATION(S)

This application is a national phase application under 35 U.S.C. 371 of International Patent Application No. PCT/IB2016/052708 filed on May 11, 2016, which claims priority from U.S. Provisional Application Ser. No. 62/162,010 filed May 15, 2015, the entire content of which is incorporated herein by reference.

TECHNICAL FIELD

The disclosure relates generally to aircraft maintenance and more particularly to the use of predetermined maintenance programs for structural elements of aircraft based on aircraft utilization.

BACKGROUND OF THE ART

A structural maintenance program for an aircraft is typically defined during the design stage of the aircraft based on the theoretical utilization of the aircraft. The theoretical utilization is considered identical for all aircraft of a given type regardless of how they are actually operated in practice by the operator of the aircraft. Some usage-based maintenance methods for aircraft components are known where an estimation of fatigue damage that a specific component has experienced during its spent life is determined and used to modify a recommended maintenance program for that specific component. Such methods involve detailed analysis of the usage information available for the component in order to calculate the estimated fatigue damage experienced by the component. This is done on a case-by-case basis and therefore can be labor intensive and costly to carry out. In some cases, the cost associated with such methods might be too high to justify the potential cost savings associated with the modified maintenance program.

SUMMARY

In one aspect, the disclosure describes an apparatus for assisting with maintenance of one or more structural elements of an aircraft. The apparatus comprises:
an input interface for receiving actual utilization data for the aircraft;
a data processor; and machine-readable memory coupled to the data processor, the machine-readable memory comprising:
  data representative of an identification of the aircraft;
  data representative of a plurality of utilization criteria respectively associated with a plurality of utilization categories for the aircraft;
  data representative of identifications of a plurality of predetermined structural maintenance programs for the aircraft and respectively associated with the utilization criteria; and
  machine-readable instructions executable by the processor and configured to cause the processor to:
    using the actual utilization data and the data representative of the plurality of utilization criteria, evaluate the actual utilization data with respect to at least one of the utilization criteria and assign one of the utilization categories to the aircraft identification;
    based on the assigned utilization category, assign one of the predetermined structural maintenance program identifications to the aircraft identification; and
    generate output data representative of the predetermined structural maintenance program identification being assigned to the aircraft identification.

The predetermined structural maintenance programs may be certified by a certification authority.

The actual utilization data may comprise a take-off weight.

The actual utilization data may comprise a flight distance.

The actual utilization data may comprise a flight duration.

The actual utilization data may comprise a landing weight.

The machine-readable instructions may be configured to cause the processor to generate output data representative of recommended utilization of the aircraft to permit keeping the predetermined structural maintenance program assigned to the aircraft identification.

The machine-readable instructions may be configured to cause the processor to generate output data representative of recommended utilization of the aircraft to permit replacing the predetermined structural maintenance program identification assigned to the aircraft identification with another of the predetermined structural maintenance program identifications.

The recommended utilization may comprise a take-off weight.

The recommended utilization may comprise a flight duration.

The recommended utilization may comprise a landing weight.

The machine-readable memory may comprise data representative of a design assumption used for designing the one or more structural elements. The machine-readable instructions may be configured to cause the processor to: using the data representative of the design assumption and the actual utilization data, evaluate the actual utilization data with respect to the design assumption and generate output data representative of a validity of the design assumption.

The data representative of at least one of the utilization criteria may be representative of a distribution of mission types for the aircraft.

The machine-readable memory may comprise data representative of an identification of the one or more structural elements of the aircraft. Assigning one of the predetermined structural maintenance program identifications to the aircraft identification may comprise assigning the predetermined structural maintenance program identification to the structural element identification.

The actual utilization data may be obtained from an onboard apparatus capable of recording actual utilization data relating to aircraft utilization parameters.

In another aspect, the disclosure describes a method for assisting with maintenance of one or more structural elements of an aircraft. The method comprises:
receiving actual utilization data for the aircraft;
evaluating the actual utilization data with respect to at least one of a plurality of utilization criteria respectively associated with a plurality of utilization categories for the aircraft, the utilization categories for the aircraft being associated with respective predetermined structural maintenance programs for the aircraft;

based on the evaluation of the actual utilization data with respect to the at least one utilization criterion, assigning one of the utilization categories to the aircraft; and based on the utilization category assigned to the aircraft, assigning one of the predetermined structural maintenance programs to the aircraft.

The method may comprise carrying out the predetermined structural maintenance program assigned to the aircraft.

The predetermined structural maintenance programs may be certified by a certification authority.

The actual utilization data may comprise a take-off weight.

The actual utilization data may comprise a flight distance.

The actual utilization data may comprise a flight duration.

The actual utilization data may comprise a landing weight.

The method may comprise recommending utilization of the aircraft to permit keeping the predetermined structural maintenance program assigned to the aircraft.

The method may comprise recommending utilization of the aircraft to permit replacing the predetermined structural maintenance program assigned to the aircraft with another of the predetermined structural maintenance programs.

The other predetermined structural maintenance program may comprise a future maintenance task of a first structural element substantially coinciding with a future maintenance task of a second structural element.

The recommended utilization may comprise a take-off weight.

The recommended utilization may comprise a flight duration.

The recommended utilization may comprise a landing weight.

Each of the predetermined structural maintenance programs may comprise an inspection schedule.

The method may comprise evaluating the actual utilization data with respect to a design assumption used for designing the one or more structural elements and determining a validity of the design assumption.

One or more of the utilization criteria may comprise a distribution of mission types for the aircraft.

Assigning one of the predetermined structural maintenance programs to the aircraft may comprise assigning the predetermined structural maintenance program to the one or more structural elements of the aircraft.

The actual utilization data may be obtained from an onboard apparatus capable of recording actual utilization data relating to aircraft utilization parameters.

In another aspect, the disclosure describes an apparatus for assisting with maintenance of one or more structural elements of an aircraft. The apparatus comprises:
an input interface for receiving actual utilization data for the aircraft;
a data processor; and
machine-readable memory coupled to the data processor, the machine-readable memory comprising:
  data representative of an identification of the aircraft;
  data representative of an identification of a first predetermined structural maintenance program assigned to the aircraft identification;
  data representative of a utilization criterion associated with a second predetermined structural maintenance program for the aircraft;
  data representative of an identification of the second predetermined structural maintenance program associated with the utilization criterion; and
  machine-readable instructions executable by the processor and configured to cause the processor to:
    using the actual utilization data and the data representative of the utilization criterion, evaluate the actual utilization data with respect to the utilization criterion and determine whether the actual utilization data meets the utilization criterion;
    if the actual utilization data meets the utilization criterion, replace the first predetermined structural maintenance program identification assigned to the aircraft identification with the second predetermined structural maintenance program identification; and
    generate output data representative of the second predetermined structural maintenance program identification being assigned to the aircraft identification.

The actual utilization data may comprise a take-off weight.

The actual utilization data may comprise a flight distance.

The actual utilization data may comprise a flight duration.

The actual utilization data may comprise a landing weight.

The machine-readable instructions may be configured to cause the processor to generate output data representative of recommended utilization of the aircraft to permit keeping the first predetermined structural maintenance program identification assigned to the aircraft identification.

The machine-readable instructions may be configured to, if the actual utilization data does not meet the utilization criterion, cause the processor to generate output data representative of recommended utilization of the aircraft configured to cause future utilization data to meet the utilization criterion.

The recommended utilization may comprise a take-off weight.

The recommended utilization may comprise a flight duration.

The recommended utilization may comprise a landing weight.

The machine-readable memory may comprise data representative of a design assumption used for designing the one or more structural elements. The machine-readable instructions may be configured to cause the processor to: using the data representative of the design assumption and the actual utilization data, evaluate the actual utilization data with respect to the design assumption and generate output data representative of a validity of the design assumption.

The data representative of the utilization criterion may be representative of a distribution of mission types for the aircraft.

The machine-readable memory may comprise: data representative of an identification of the one or more structural elements of the aircraft; and data representative of the identification of the first predetermined structural maintenance program assigned to the identification of the one or more structural elements of the aircraft.

The actual utilization data may be obtained from an onboard apparatus capable of recording actual utilization data relating to aircraft utilization parameters.

In another aspect, the disclosure describes a method for assisting with maintenance of one or more structural elements of an aircraft where the aircraft has a first predetermined structural maintenance program assigned thereto. The method comprises:
  receiving actual utilization data for the aircraft;
  evaluating the actual utilization data with respect to a utilization criterion associated with a second predetermined structural maintenance program for the aircraft and determining whether the actual utilization data meets the utilization criterion; and if the actual utilization data meets the utilization criterion, assigning the second predetermined structural maintenance program to the aircraft.

The method may comprise carrying out the second predetermined structural maintenance program.

The second predetermined structural maintenance program may be certified by a certification authority.

The actual utilization data may comprise a take-off weight.

The actual utilization data may comprise a flight distance.

The actual utilization data may comprise a flight duration.

The actual utilization data may comprise a landing weight.

The method may comprise recommending utilization of the aircraft to permit keeping the first predetermined structural maintenance program assigned to the aircraft.

The method may comprise, if the actual utilization data does not meet the utilization criterion, recommending utilization of the aircraft configured to cause future utilization data to meet the utilization criterion.

The recommended utilization may comprise a take-off weight.

The recommended utilization may comprise a flight duration.

The recommended utilization may comprise a landing weight.

The second predetermined structural maintenance program may comprise a future maintenance task of a first structural element substantially coinciding with a future maintenance task of a second structural element of the aircraft.

The first and second predefined structural maintenance programs may each comprise an inspection schedule.

The method may comprise evaluating the actual utilization data with respect to a design assumption used for designing the one or more structural elements and determining a validity of the design assumption.

The utilization criterion may comprise a distribution of mission types for the aircraft.

The first or second predetermined structural maintenance programs may be assigned to the one or more structural elements of the aircraft.

The actual utilization data may be obtained from an onboard apparatus capable of recording actual utilization data relating to aircraft utilization parameters.

In another aspect, the disclosure describes an apparatus for assisting with maintenance of one or more structural elements of an aircraft. The apparatus comprises:
an input interface for receiving actual utilization data for the aircraft;
a data processor; and
machine-readable memory coupled to the data processor, the machine-readable memory comprising:
  data representative of an identification of the aircraft;
  data representative of an identification of a first predetermined structural maintenance program assigned to the aircraft identification;
  data representative of a utilization criterion associated with a second predetermined structural maintenance program for the aircraft;
  data representative of an identification of the second predetermined structural maintenance program associated with the utilization criterion; and
  machine-readable instructions executable by the processor and configured to cause the processor to:
    using the actual utilization data and the data representative of the utilization criterion, evaluate the actual utilization data with respect to the utilization criterion and determine whether the actual utilization data meets the utilization criterion;
    if the actual utilization data does not meet the utilization criterion, generate data representative of recommended utilization for the aircraft configured to cause future utilization data to meet the utilization criterion; and
    generate output data representative of the recommended utilization being assigned to the aircraft identification.

The actual utilization data may comprise a take-off weight.

The actual utilization data may comprise a flight distance.

The actual utilization data may comprise a flight duration.

The actual utilization data may comprise a landing weight.

The machine-readable memory may comprise data representative of a utilization criterion associated with the first predetermined structural maintenance program. The machine-readable instructions may be configured to cause the processor to generate output data representative of recommended utilization of the aircraft configured to cause the future utilization data to meet the utilization criterion associated with the first predetermined structural maintenance program.

The recommended utilization may comprise a take-off weight.

The recommended utilization may comprise a flight duration.

The recommended utilization may comprise a landing weight.

The machine-readable memory may comprise data representative of a design assumption used for designing the one or more structural elements. The machine-readable instructions may be configured to cause the processor to: using the data representative of the design assumption and the actual utilization data, evaluate the actual utilization data with respect to the design assumption and generate output data representative of a validity of the design assumption.

The data representative of at least one of the utilization criteria may be representative of a distribution of mission types for the aircraft.

The recommended utilization may comprise a recommended distribution of mission types.

The machine-readable memory may comprise: data representative of an identification of the one or more structural elements of the aircraft; and data representative of the identification of the first predetermined structural maintenance program assigned to the identification of the one or more structural elements of the aircraft.

The actual utilization data may be obtained from an onboard apparatus capable of recording actual utilization data relating to aircraft utilization parameters.

In another aspect, the disclosure describes a method for assisting with maintenance of one or more structural elements of an aircraft where the aircraft has a first predetermined structural maintenance program assigned thereto. The method comprises:
  receiving actual utilization data for the aircraft;
  evaluating the actual utilization data with respect to a utilization criterion associated with a second predetermined structural maintenance program for the aircraft and determining whether the actual utilization data meets the utilization criterion; and if the actual utilization data does not meet the utilization criterion, recommending utilization for the aircraft configured to cause future utilization data of the aircraft to meet the utilization criterion.

The actual utilization data may comprise a take-off weight.

The actual utilization data may comprise a flight distance.

The actual utilization data may comprise a flight duration.

The actual utilization data may comprise a landing weight.

The method may comprise recommending utilization of the aircraft configured to cause the future utilization data to meet a utilization criterion associated with the first predetermined structural maintenance program.

The recommended utilization may comprise a take-off weight.

The recommended utilization may comprise a flight duration.

The recommended utilization may comprise a landing weight.

The first and second maintenance programs may each comprise an inspection schedule.

The method may comprise evaluating the actual utilization data with respect to a design assumption used for designing the one or more structural elements and determining a validity of the design assumption.

The utilization criterion may comprise a distribution of mission types for the aircraft.

The recommended utilization may comprise a recommended distribution of mission types.

The first or second predetermined structural maintenance programs may be assigned to the one or more structural elements of the aircraft.

The actual utilization data may be obtained from an onboard apparatus capable of recording actual utilization data relating to aircraft utilization parameters.

In another aspect, the disclosure describes an apparatus for assisting with the design of a structural element of an aircraft. The apparatus comprises:
an input interface for receiving actual utilization data for the aircraft;
a data processor; and
machine-readable memory coupled to the data processor, the machine-readable memory comprising:
  data representative of a design assumption used for designing the structural element; and
  machine-readable instructions executable by the processor and configured to cause the processor to:
    using the actual utilization data and the data representative of the design assumption, evaluate the actual utilization data with respect to the design assumption and assign an indication of validity to the design assumption; and
    generate output data representative of the indication of validity being assigned to the design assumption.

The actual utilization data may comprise a take-off weight.

The actual utilization data may comprise a flight distance.

The actual utilization data may comprise a flight duration.

The actual utilization data may comprise a landing weight.

The actual utilization data may be indicative of a mission type for the aircraft.

In another aspect, the disclosure describes a method for assisting with the design of a structural element of an aircraft. The method comprises:
receiving actual utilization data for the aircraft;
evaluating the actual utilization data with respect to a design assumption used for designing the structural element; and
based on the evaluation of the actual utilization data with respect to the design assumption, determining a validity of the design assumption.

The actual utilization data may comprise a take-off weight.

The actual utilization data may comprise a flight distance.

The actual utilization data may comprise a flight duration.

The actual utilization data may comprise a landing weight.

The actual utilization data may be indicative of a mission type for the aircraft.

Further details of these and other aspects of the subject matter of this application will be apparent from the detailed description and drawings included below.

DESCRIPTION OF THE DRAWINGS

Reference is now made to the accompanying drawings, in which:

FIG. 3 is a table illustrating a structure of data relating to predetermined maintenance programs for a structural element of the aircraft of FIG. 1;

FIG. 4 is a table illustrating a structure of data relating to utilization categories for the aircraft of FIG. 1;

FIG. 6 is a table illustrating a structure of data comprising actual utilization data and respectively assigned utilization categories for different aircraft;

FIG. 7A is a table illustrating a structure of data comprising utilization categories assigned to different aircraft and predetermined maintenance programs assigned to structural elements of such aircraft;

FIG. 7B is a table illustrating a structure of data comprising utilization categories assigned to different aircraft and predetermined maintenance programs assigned to such aircraft;

FIG. 8 is a table illustrating a structure of data comprising utilization recommendations for different aircraft;

FIGS. 9A-9C are timelines that respectively illustrate exemplary maintenance programs associated with a structural element of an aircraft for three different utilization categories for the aircraft;

FIG. 11 is a table illustrating a structure of data comprising design assumptions associated with different structural elements;

FIG. 12 is a table illustrating a structure of data comprising indications of validity for associated design assumptions;

DETAILED DESCRIPTION

Figure 1:
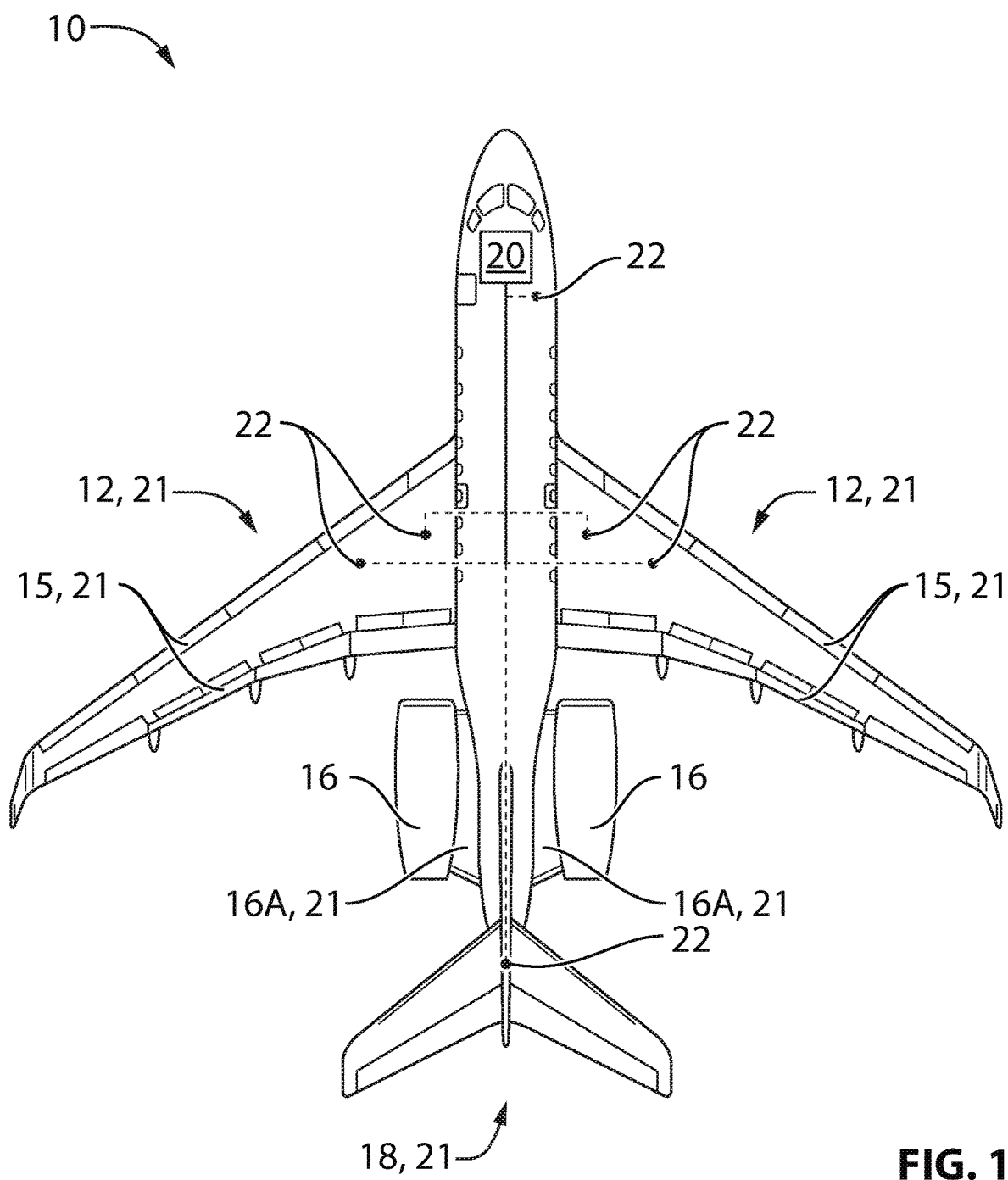
FIG. 1 is a top plan view of an exemplary aircraft comprising an exemplary onboard apparatus for assisting with maintenance of the aircraft.

The present disclosure relates to maintenance and design of structural elements for aircraft. Various aspects of the present disclosure could also be used for maintenance and design of other mechanical systems and/or with other types of mobile platforms (e.g., vehicles).

The present disclosure discloses methods and apparatus for assisting with maintenance and/or design of aircraft and, in particular, assisting with the maintenance and/or design of structural elements including principal structural elements (PSEs) of aircraft. In various embodiments, the apparatus and methods disclosed herein may make use of predetermined structural maintenance programs (e.g., inspection schedules, component replacement schedules) for structural elements of mobile platforms where each predetermined maintenance program has an aircraft utilization category associated therewith. The predetermined maintenance programs for a particular structural element may be pre-certified by an applicable certification authority (e.g., Federal Aviation Administration, European Aviation Safety Agency, Transport Canada) for specific utilization categories for a type of aircraft. For example, a predetermined maintenance program for a structural element of an aircraft may be associated with baseline, light or super light utilization categories of the aircraft. Actual utilization data for the aircraft may be used to select one of the predetermined maintenance programs based on the utilization of the aircraft without having to calculate fatigue parameters (e.g., estimated amount of fatigue damage) experienced by the specific structural element on a case-by-case basis. The identification of a predetermined maintenance program for a specific structural element using apparatus and/or methods disclosed herein may be relatively simple and economical. Also, in some circumstances, the identification of a predetermined maintenance program that is based on actual utilization of an aircraft may result in significant savings in maintenance costs for aircraft operators.

In some embodiments, the methods and apparatus disclosed herein may permit the use of a pre-determined number of pre-defined and certified structural maintenance programs based on different utilization categories rather than having to certifying a process for generating custom, individual structural maintenance programs determined on a case by case basis.

In some embodiments, the methods and apparatus disclosed herein may provide utilization recommendations for an aircraft in order to keep that aircraft assigned to a desired structural maintenance program. Alternatively or in addition, the methods and apparatus disclosed herein may provide utilization recommendations for an aircraft or fleet of aircraft in order to replace a current structural maintenance program assigned to the aircraft with another, more desirable (e.g., more economical) predetermined structural maintenance program that is appropriate for the utilization of the aircraft or a fleet of aircraft.

In some embodiments, apparatus and methods disclosed herein may be used to validate one or more design assumptions used for designing a structural element of an aircraft. Such validation may be used to refine the design of the structural component based on actual utilization data. For example, the validation of design assumptions may be used to modify the design of a structural element to increase its load-carrying ability so as to improve its reliability or to reduce its weight depending on whether a structural element is determined to be under-designed or over-designed based on the utilization data. The validation of design assumptions using the apparatus and methods disclosed herein may in some situations decrease development time and cost for new aircraft programs and improve the reliability of existing and new aircraft.

Aspects of various embodiments are described through reference to the drawings.

FIG. 1 is a top plan view of an exemplary aircraft 10 with which the apparatus and methods disclosed herein may be used. Aircraft 10 may be any type of aircraft such as corporate, private, commercial and passenger aircraft suitable for civil aviation. For example, aircraft 10 may be a narrow-body, twin-engine jet airliner. Aircraft 10 may be a fixed-wing aircraft or a rotary-wing aircraft. Aircraft 10 may comprise one or more wings 12 including flight control surfaces 15, fuselage 14, one or more engines 16, empennage 18 and one or more landing gears (not shown). One or more of engines 16 may be mounted to fuselage 14. Alternatively, or in addition, one or more of engines 16 may be mounted to wings 12.

FIG. 1 also shows onboard apparatus 20 for assisting with maintenance of aircraft 10. Onboard apparatus 20 may also be used to detect events onboard aircraft 10. Onboard apparatus 20 may be coupled to one or more sensors 22 associated with one or more systems of aircraft 10. Onboard apparatus 20 and sensors 22 are shown schematically in FIG. 1 and are shown as being superimposed over aircraft 10 for illustration purpose only. Onboard apparatus 20 may be coupled to sensors 22 via wired or wireless connections. The one or more systems coupled to onboard apparatus 20 may be located in different areas of aircraft 10. The systems may include any monitored system(s) of aircraft 10 and aspects of the present disclosure are not intended to be limited to the specific systems disclosed herein. By way of non-limiting examples, such systems may include fuel tanks and fuel delivery systems, landing gear, avionics equipment, flight control computers, engines, power generators, flight control surfaces, actuators, hydraulic pumps, water tanks, in-flight entertainment systems, pressurization systems, doors, lavatories, and various line replaceable units (LRUs).

Onboard apparatus 20 may be configured to detect one or more events associated with one or more systems of aircraft 10. The detection of such events may be based on logic rules (e.g., thresholds) stored in memory 26 for sensed utilization parameters associated with the one or more systems. Accordingly, onboard apparatus 20 may be configured to monitor one or more systems of aircraft 10 and detect such events. An event may, for example, include an indication of degraded performance, a non-normal operating condition, a fault (i.e. failure) condition, a precursor to a fault condition or any other condition that may require attention, further investigation, maintenance or other action. Onboard apparatus 20 may also be used to record other utilization parameters of aircraft 10 such as take-off weight, duration (hours) of operation, flight duration (hours), flight distance, landing weight and maximum altitude for example. Data acquired by onboard apparatus 20 may be used to characterize the type of utilization of aircraft 10. For example, the data acquired by onboard apparatus 20 may be used to determine the types of missions flown by aircraft 10 and assign a utilization category (i.e., baseline, light, super-light) to aircraft 10.

In various aspects, systems and methods of the present disclosure may be used in conjunction with predetermined maintenance programs specific to structural elements 21 including PSEs of aircraft 10 or to aircraft 10 as a whole. PSEs are typically considered those which contribute significantly to carrying flight, ground, and pressurization loads. For example, by way of non-limiting examples, PSEs may include: wings 12; empennage 18; flight control surfaces 15 and their associated mechanical systems and attachments; integrally stiffened panels; primary fittings; principal splices; skin or reinforcement around cutouts or discontinuities; skin-stringer combinations; spar caps; spar web; fuselage 14; circumferential frames and adjacent skin; door frames; pilot-window posts; pressure bulkheads; door skins, frames, and latches; window frames; landing gear and their attachments; and engine mounts 16A.

Figure 2:
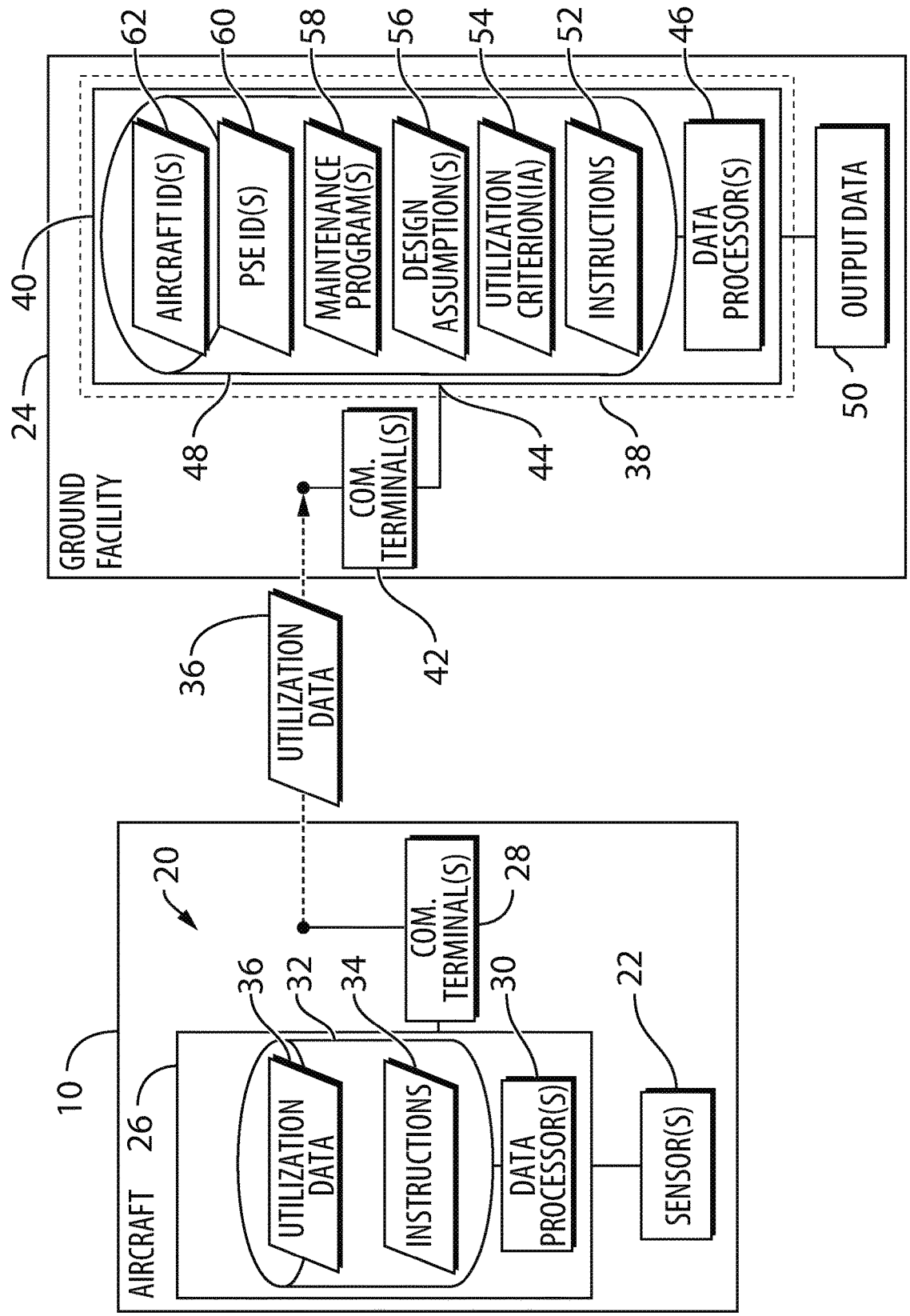
FIG. 2 shows a schematic representation of the aircraft of FIG. 1 and a schematic representation of an exemplary ground facility for assisting with maintenance of the aircraft.

FIG. 2 shows a schematic representation of aircraft 10 and also a schematic representation of ground facility 24. Onboard apparatus 20 (shown in FIG. 1) of aircraft 10 may comprise one or more health monitoring units 26 (referred hereinafter as "HMU 26") and one or more communication terminals 28 (referred hereinafter as "terminal 28") for receiving messages (i.e., signals) and for transmitting messages (i.e., signals) from aircraft 10. HMU 26 may be coupled to terminal 28 and also coupled to one or more monitored systems of aircraft 10 via sensors 22. HMU 26 may comprise one or more data processors 30 (referred hereinafter as "processor 30") and machine-readable memory(ies)/medium(ia) (referred hereinafter as "memory 32") containing machine-readable instructions 34 readable and executable by processor 30. HMU 26 may handle the monitoring, recording and offloading of data related to aircraft 10. Memory 32 of HMU 26 may also contain actual utilization data 36 associated with aircraft 10. Actual utilization data 36 may comprise one or more take-off weights, duration of operation, one or more flight durations, one or more flight distances, one or more landing weights, and/or any other utilization data that may be useful in characterizing the utilization of aircraft 10. Actual utilization data 36 may be transmitted substantially in real time while aircraft 10 is in operation. Actual utilization data 36 may be transmitted substantially continuously or intermittently from aircraft 10. Ground facility 24 may receive actual utilization data 36 from one or from a plurality of aircraft 10 so that apparatus 38 may carry-out one or more related steps or methods immediately upon receipt of such actual utilization data 36 or at a later time.

Ground facility 24 may comprise a single facility or a combination of two or more facilities. For example, ground facility 24 may include the facility of one or more of: a manufacturer of aircraft 10, a manufacturer of one or more systems or structural elements 21 of aircraft 10, an operator of aircraft 10, a maintenance provider for part of aircraft 10, a data service provider and/or any other authorized party involved in the health monitoring, operation and/or maintenance of aircraft 10. Ground facility 24 may comprise a combination of two or more facilities that may be located remotely from each other and between which data transfer may be conducted via known or other means. Ground facility 24 may comprise apparatus 38 which may also assist with maintenance of aircraft 10. Apparatus 38 may comprise one or more computers 40 (referred hereinafter as "computer 40"), which may be coupled to one or more communication terminals 42 (referred hereinafter as "terminal 42"). Terminal 42 may be configured to receive messages (i.e., signals) and for transmitting messages (i.e., signals) to aircraft 10. Data representative of actual utilization data 36 received via terminal 42 may be transmitted to input interface 44 of computer 40.

Apparatus 38 may comprise one or more data processors 46 (referred hereinafter as "processor 46") and one or more machine-readable memory(ies)/medium(ia) 48 (referred hereinafter as "memory 48") containing instructions readable and executable by processor 46. Apparatus 28 may comprise one or more display devices coupled to computer 40 to permit communication of information to a user of apparatus 38 via suitable graphic user interface (GUI). Such display may be used to visually communicate information such as output data 50 of computer 40 to a user. Such display may be part of a portable electronic device such as a smart phone, tablet computer and/or laptop computer which may be in communication with computer 40 or may comprise computer 40. Any suitable means for communicating output data 50 to a user (e.g., operator, maintenance provider, manufacturer of aircraft 10) of apparatus 38 may be used. Other user input means (i.e., input interface 44) such as a keyboard, data communication port(s), mouse or voice-based input means may be part of apparatus 38 and may be used to communication actual utilization data 36 to computer 40. Memory 48 may have machine-readable instructions 52, one or more utilization criteria 54, one or more design assumptions 56, one or more definitions of predetermined maintenance programs 58, one or more identifications (referred as "PSE ID(s) 60" in FIG. 2) of structural elements 21, one or more identifications (referred as "Aircraft ID(s) 62" in FIG. 2), stored thereon. For example, memory 48 may comprise data pertaining to a single aircraft 10 or to a plurality of aircraft 10 such as a fleet. Instructions 52 may be readable and executable by processor 46.

Processors 30 and 46 may, for example, comprise or be part of one or more digital computer(s), other data processors or other suitably programmed or programmable logic circuits. Processors 30 and 46 may comprise or be part of general purpose computer(s), special purpose computer(s), or other programmable data processing apparatus. In some embodiments, processor 30 may be configured for use onboard aircraft 10.

Memories 32 and 48 may comprise any combination of one or more suitable computer readable medium(ia). The computer readable medium may be a non-transitory computer readable storage medium. Memories 32 and 48 may include a suitable combination of any type of computer memory such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memories 32 and 48 may comprise any storage means (e.g. devices) suitable for retrievably storing machine-readable instructions 34 and 52 executable by processors 30 and 46 respectively.

Terminals 28 and 42 may be configured to permit communication between aircraft 10 and ground-facility 24 via known or other communication methods and protocols. Accordingly, additional intermediate components (not shown) may be required to establish communication between terminals 28 and 42.

In various embodiments, terminals 28 and 42 may be configured for communication using two or more communication protocols so that different communication protocols may be used for different types of communications. For example, terminals 28 and 42 may be configured for communication via Aircraft Communications Addressing and Reporting (ACARS) communication protocol.

ACARS communication may be conducted via satellite communication (SATCOM) or very high frequency (VHF) radio. Terminals 28 and 42 may also be configured for communication via a communication protocol from the Internet suite of protocols commonly known as TCP/IP (referred hereinafter as "Internet protocol"). Communication between terminals 28 and 42 using an Internet protocol may be achieved via SATCOM, cellular communication or WiFi, for example. Communication between terminals 28 and 42 could also be done using a wired connection and/or a physical memory device such as a USB (Universal Serial Bus) memory drive.

Various tasks and methods performed by HMU 22 and apparatus 38 are described below. However, some tasks and methods said to be performed by apparatus 38 could be performed by HMU 22 or other device(s) onboard aircraft 10. Specifically, even though computer 40 is shown to be part of ground facility 24 in the example shown in FIG. 2, some or all functions carried out by computer 40 could be carried out onboard aircraft 10.

Various aspects of the present disclosure may be embodied as an apparatus, methods or computer program products. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more non-transitory computer readable medium(ia) having computer readable program code (machine-readable instructions) embodied thereon. The computer program product may, for example, be executed by a computer, processor or other suitable logic circuit to cause the execution of one or more methods disclosed herein in their entirety or in part.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or other programming languages. The program code may execute entirely or in part by computer 40 and/or other computer (e.g. HMU 26), which may be off or onboard of aircraft 10.

Such computer program code may be applied to input data such as actual utilization data 36 to perform functions described herein and to generate output data 50. Output data 50 may be applied to one or more output devices for communicating output data 50 to a user or to another device.

As explained below, the data stored in memory 48 may be arranged in a suitable data structure so that it may be used efficiently by computer 40. For example, the data stored in memory 48 may be arranged in one or more tables that may be part of a data base. The data may be processed according to known or other methods in order to assign a predetermined maintenance program to a structural element 21 or to aircraft 10 as a whole for example, or, to conduct other manipulations of data as explained below.

FIG. 3 is a table illustrating a structure of data relating to predetermined structural maintenance programs 58, which may be stored in memory 48 of apparatus 38. Data relating to predetermined maintenance programs 58 may comprise a description of one or more predetermined maintenance programs 58 where each description may be associated with a unique maintenance program ID. The maintenance program description may comprise information about maintenance-related tasks and associated intervals. For example, each predetermined maintenance program may comprise a recommended inspection schedule, a recommended part replacement schedule, and/or any other maintenance-related activity associated with one or more structural elements 21. Each maintenance program 58 may have an aircraft utilization category 59 associated thereto so that, for example, a less severe utilization of aircraft 10 may require a less severe maintenance program 58.

Maintenance programs 58 may be predetermined and preapproved (i.e., certified) by a certification authority for different utilization categories of aircraft 10. Predetermined maintenance programs 58 may be based on fatigue, environmental (e.g., temperatures, humidity) and/or accidental damage estimations for structural element 21 determined using known or other methods. However, instead of having only one recommended maintenance program, a plurality of predetermined maintenance programs 58 corresponding to different utilization categories 59 (shown in FIG. 4) for aircraft 10 may be provided. Accordingly, in order to assign a particular maintenance program 58 to a specific structural element 21 and/or aircraft 10 as a whole, the fatigue, environmental and/or accidental damage may not need to be determined on a case-by-case basis. Predetermined maintenance programs 58 as referenced herein may be specific to one or more particular structural elements 21 of aircraft 10 or be specific to aircraft 10 as a whole. For example, an aircraft-level predetermined maintenance program 58 could be based on a combination of a plurality of structural element-specific predetermined maintenance programs 58.

Due to the complex and resource intensive nature of fatigue assessments for deriving a maintenance (e.g., inspection, part replacement) program, a method which groups structural elements 21 into control points may be used. Structural elements 21 may be grouped within a control point if they exhibit similar fatigue behavior when the mission type is varied. This may be determined using a spectrum severity factor. The analysis required to derive inspection intervals must therefore only be done for the control point and the results may be applied to all structural elements 21 within the control point. This control point methodology may, in some cases, provide sufficiently accurate inspection intervals while reducing calculation times by 80%-90%. Using marketing data of similar aircraft and the control point analysis over a large number of flights, inspection programs and intervals may be defined using the control point methodology.

Fatigue event occurrences used for fatigue analysis can include but are not limited to: runway bumps, runway turns, thrust vs. brakes, manoeuvres, gusts, and control surface deflections. Such event occurrences may be extracted from actual utilization data 36. Actual utilization data 36 may be used to obtain occurrence and exceedance curves for each flight event based on a plurality of flights and aircraft 10.

FIG. 4 is a table illustrating a structure of data relating to utilization categories 59, which may be stored in memory 48 of apparatus 38. Data relating to utilization categories 59 may comprise a description of one or more predetermined utilization categories 59 where each description may be associated with a unique utilization category ID. Each utilization category 59 may have one or more utilization criteria 54 associated therewith. In some embodiments, utilization categories 59 may not necessarily be specific to structural element 21 but may be representative of the utilization of aircraft 10 as a whole. Accordingly, the identification of a suitable predetermined maintenance program 58 for a specific structural element 21 may be done based on data that is readily available and may not involve fatigue damage assessment on a case-by-case basis. Utilization criteria 54 may be used to determine which utilization category 59 may be assigned to aircraft 10 based on actual utilization data 36 of aircraft 10. For example, Category 1 may be associated with a baseline utilization of aircraft 10, Category 2 may be associated with a light utilization of aircraft 10 which may induce less fatigue damage than Category 1, and, Category 3 may be associated with an super-light utilization of aircraft 10 which may induce less fatigue damage than Category 2. Criteria 54 may be defined based on theoretical utilization, design assumptions, and, fatigue, environmental and/or accidental damage estimated according to known or other methods (e.g., fatigue damage calculations).

In various embodiments, utilization parameter(s) 36 may include one or more of: a take-off weight of aircraft 10, duration (hours) of operation of aircraft 10, flight duration (hours) of aircraft 10, flight distance of aircraft 10 and a landing weight of aircraft 10. As explained below, utilization parameter(s) 36 and utilization criterion(ia) 54 may be used to determine the types of missions carried out by aircraft 10. For example, in some situations, no stress/strain measurement obtained directly from structural element 21 may be necessary in order to assign a predetermined maintenance program 58 to structural element 21.

Actual utilization data 36 may be used to determine which utilization category applies to a specific aircraft 10. In various embodiments, a K-Nearest Neighbor (KNN) or other software classification algorithms may be used to determine the applicable utilization category 59 based on actual utilization data 36. The determination of the applicable utilization category 59 may be updated continuously or intermittently as actual utilization data 36 is received by apparatus 38. In some situations, it might be possible that the utilization category 59 of aircraft 10 changes and that, consequently, the predetermined maintenance program 58 previously assigned to structural element 21 of aircraft 10 may also change in view of a new utilization category 59 that may have been adopted by aircraft 10.

Figure 5:
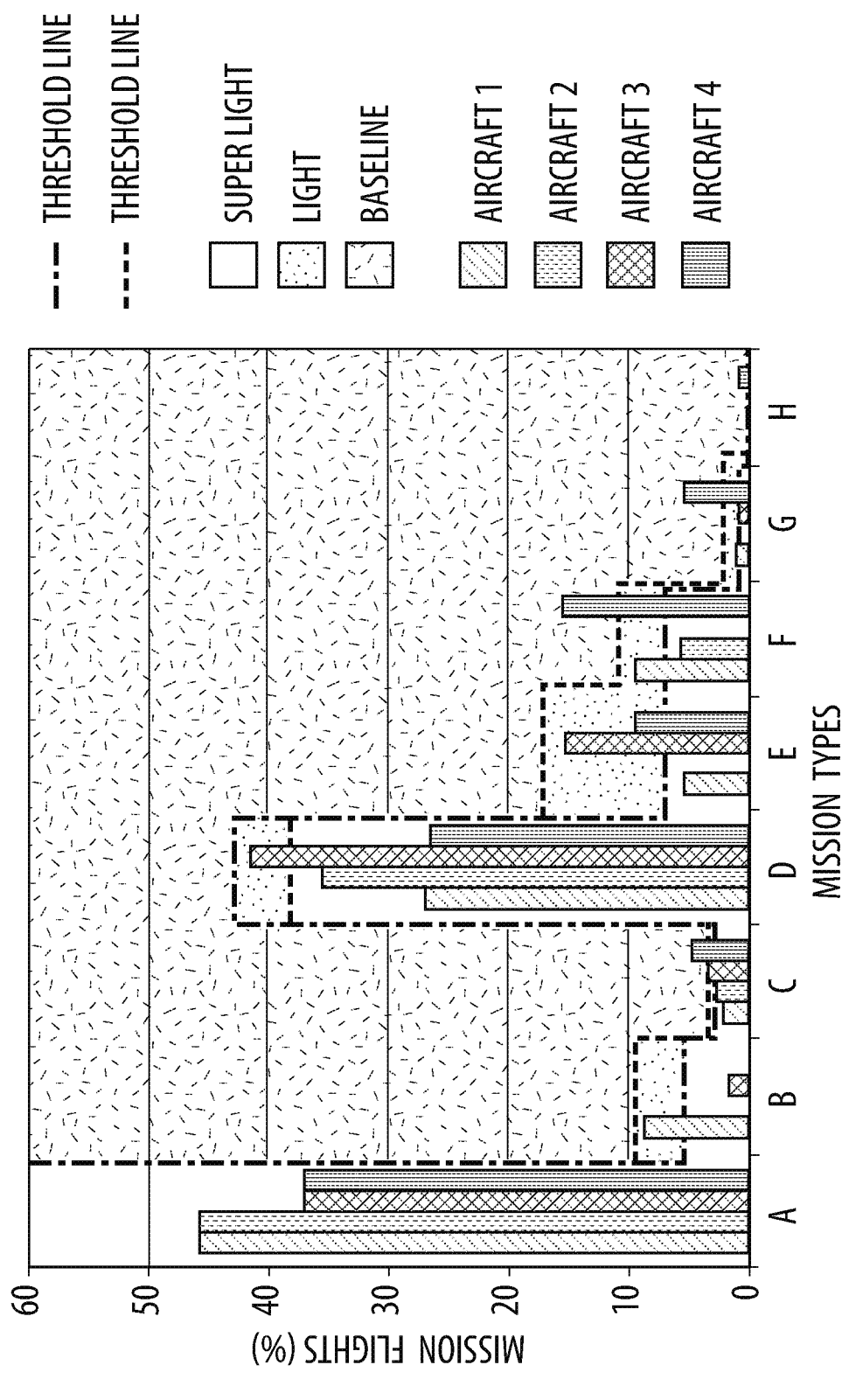
FIG. 5 is a bar graph illustrating exemplary data of the percentage of flights that fall within eight (8) different mission types (A to H) for four (4) aircraft of a same type.

FIG. 5 is a bar graph illustrating exemplary data of the percentage of flights that fall within eight (8) different mission types (A to H) for four (4) aircraft of a same type. Mission types may be defined based on one or more operational and/or environmental parameters of an aircraft taken individually or in combination. For example, such operational parameters may include flight duration (e.g., 2 hours, 4 hours or 6 hours), passenger and cargo loads (i.e., low, medium or maximum capacity) and fuel quantity for example. Data representative of the information displayed in FIG. 5 may be based on actual utilization data 36 and represent a mission distribution for aircraft 10 plotted against utilization criteria 54. The bar graph shows regions within the graph corresponding to the Baseline, Light and Super-Light utilization categories 59. In some embodiments, the assigned utilization category 59 may be based on the effect on fatigue or environmental damage that the utilization category 59 of aircraft 10 may have on structural element 21. For example, while aircraft 10 may conduct missions of various types, the assigned utilization category 59 may be determined based on thresholds for each mission type. For example, if a threshold number of missions is exceeded for one or more types of missions, aircraft 10 may have to be re-assigned to a different (e.g., more severe) utilization category 59. With respect to this exemplary aircraft type represented in FIG. 5, eight mission types may be flown by aircraft 1-4. However, depending on the type of aircraft 10 and also on the method(s) used to characterize aircraft utilization, additional or fewer mission types may be used.

FIG. 5 shows threshold lines between different utilization categories 59 for some mission types (see mission type D for example). Accordingly, in some embodiments, the utilization category 59 may be determined based on the distribution of mission types flown by aircraft 10. Other methods may be used to determine an appropriate utilization category 59 for aircraft 10 in order to identify a suitable predetermined maintenance program 58. The mission types identified for aircraft 10 may be correlated to actual utilization data 36.

In accordance with one embodiment, apparatus 38 may be used for assisting with maintenance of one or more structural elements 21 of aircraft 10. For example, apparatus 38 may be used for identifying a predetermined structural maintenance program 58 suitable for structural element 21 or aircraft 10 as a whole based on actual utilization data 36 of aircraft 10. In reference to FIG. 2 again, apparatus 38 may comprise: input interface 44 for receiving data representative of actual utilization data 36 of aircraft 10, processor 46 and memory 48 coupled to processor 46. Memory 48 may comprise: data representative of an identification 62 of aircraft 10; data representative of an identification 60 of structural element 21; data representative of a plurality of utilization criteria 54 respectively associated with a plurality of utilization categories 59 (shown in FIG. 4) for aircraft 10; data representative of identifications of a plurality of predetermined maintenance programs 58 respectively associated with the utilization criteria 54 (see FIGS. 3 and 4); machine-readable instructions 52 executable by processor 46. Instructions 52 may be configured to cause processor 46 to: using actual utilization data 36 and the data representative of the plurality of utilization criteria 54, evaluate actual utilization data 36 with respect to at least one of the utilization criteria 54 and assign one of the utilization categories 59 to the specific aircraft identification 62; based on the assigned utilization category 59, assign one of the predetermined maintenance program identifications to structural element identification 60 or to aircraft identification 62; and generate output data 50 representative of the predetermined maintenance program identification being assigned to the structural element identification 60 or to aircraft identification 62.

FIG. 6 is a table illustrating a structure of data that may be generated using apparatus 38 and methods described herein. The data shown in FIG. 6 may be stored in memory 48 and used as a basis for generating output data 50 shown in FIG. 2. For example, the data of FIG. 6 may comprise an aircraft ID 62 having actual utilization data 36 associated therewith and a particular utilization category 59 assigned thereto via an utilization category ID.

FIG. 7A is a table illustrating a structure of data that may be generated using apparatus 38 and methods described herein. The data shown in FIG. 7A may be stored in memory 48 and used as a basis for generating output data 50 shown in FIG. 2. For example, the data of FIG. 7A may comprise an aircraft ID 62 with a particular utilization category 59 assigned thereto via an utilization category ID. Also, a structural element 21 of the specific aircraft ID may have a predetermined maintenance program 58 assigned thereto via a maintenance program ID. Predetermined maintenance programs 58 listed in FIG. 7A may be specific to structural element(s) 21 (i.e. PSE IDs 60).

FIG. 7B is a table illustrating a structure of data that may be generated using apparatus 38 and methods described herein. The data shown in FIG. 7B may be stored in memory 48 and used as a basis for generating output data 50 shown in FIG. 2. For example, the data of FIG. 7B may comprise an aircraft ID 62 with a particular utilization category 59 assigned thereto via an utilization category ID. Each aircraft ID 62 may have a predetermined maintenance program 58 assigned thereto via a maintenance program ID. As explained above, predetermined maintenance programs 58 at the aircraft level may be determined, for example, by way of combination of a plurality of predetermined maintenance programs 58 respectively associated with a plurality of structural elements 21 of aircraft 10 so that an overall aircraft-level predetermined maintenance program 58 may be defined.

In some embodiments, instructions 52 may be configured to cause processor 46 to generate output data 50 representative of recommended utilization of aircraft 10 to permit keeping a predetermined maintenance program 58 previously assigned to structural element 21 or aircraft 10 as a whole, or, of recommended utilization of aircraft 10 to permit replacing a predetermined maintenance program 58 previously assigned to structural element 21 or aircraft 10 as a whole. For example, output data 50 may be representative of one or more recommendations for an operator of aircraft 10 that may help the operator carry out the type of missions that would permit aircraft 10 to stay within a desired utilization category 59 and associated predetermined maintenance program 58 or to change to another utilization category 59 and associated other predetermined maintenance program 58.

In some embodiments, instructions 52 may be configured to cause processor 46 to generate output data 50 representative of recommended utilization for a fleet of aircraft 10 to permit keeping one or more aircraft 10 of the fleet with a predetermined maintenance program 58 previously assigned to structural element 21 or aircraft 10 as a whole, or, of recommended utilization of the fleet to permit replacing a predetermined maintenance program 58 previously assigned to structural element 21 or aircraft 10 as a whole. For example, output data 50 may be representative of one or more recommendations for an operator of the fleet that may help the operator keep one or more aircraft 10 of the fleet with a desired predetermined maintenance program 58 for structural element 21. For example, output data 50 may be representative of one or more recommendations to transfer some utilization of one or more aircraft 10 within the fleet to one or more other aircraft 10 within the same fleet. For example, output data 50 may be representative of one or more recommendations to more evenly distribute the utilization of the plurality of aircraft 10 within the same fleet or to unevenly distribute the utilization of the plurality of aircraft 10 within the fleet such that a portion of the fleet may be assigned a lighter maintenance program 58. Such recommended utilization may be configured to help an operator of a fleet of aircraft 10 reduce maintenance/inspection costs at the fleet level.

The recommended utilization of aircraft 10 may be in the form of one or more utilization parameters to conform to by aircraft 10. The recommended utilization may be used by an operator of aircraft 10 to ensure that the mission types flown by aircraft 10 are in accordance with the desired utilization category 59. For example, in some embodiments, a recommended utilization may comprise a take-off weight not to be exceeded and/or a recommended margin for the take-off weight. Alternatively or in addition, a recommended utilization may comprise a number of flight hours not to be exceeded and/or a recommended margin for the number of flight hours for a certain number of flights. Alternatively or in addition, a recommended utilization may comprise a landing weight not to be exceeded and/or a recommended margin for the landing weight. Alternatively or in addition, a recommended utilization may comprise a flight duration not to be exceeded and/or a recommended margin for the flight duration. Alternatively or in addition, a recommended utilization may comprise an altitude not to be exceeded and/or a recommended margin for the altitude. Alternatively or in addition, a recommended utilization may comprise a recommended distribution of mission types as illustrated in FIG. 5. In some embodiments, the recommended utilization may take into consideration previous utilization of aircraft 10 into account. In some embodiments, apparatus 38 may also be used to verify that an operator of aircraft 10 is operating aircraft 10 as prescribed by the recommended utilization.

FIG. 8 is a table illustrating another structure of data that may be generated using apparatus 38 and methods described herein. The data shown in FIG. 8 may be stored in memory 48 and used as a basis for generating output data 50 shown in FIG. 2. For example, the data of FIG. 8 may comprise an aircraft ID 62 having a particular utilization category 59 assigned thereto via an utilization category ID. The data of FIG. 8 may also comprise, for each aircraft ID 62 one or more utilization recommendations for keeping aircraft 10 in the current utilization category 59. The data of FIG. 8 may also comprise, for each aircraft ID 62 one or more utilization recommendations for placing aircraft 10 in another utilization category 59.

Instead or in addition, recommendations for keeping or replacing a utilization category 59 could be made at the fleet level so that each fleet could be associated with one or more utilization category IDs and the recommendations could be configured to help an operator of the fleet of aircraft 10 reduce maintenance/inspection costs at the fleet level.

FIGS. 9A-9C are timelines that graphically illustrate exemplary predetermined maintenance programs 58 wherein each predetermined maintenance program 58 includes one or more maintenance-related tasks such as one or more inspections of structural element 21 (or aircraft 10 as a whole). For example, FIG. 9A shows tasks A-E that may be part of a predetermined maintenance program 58 (i.e., Program 1) for structural element 21 (identified as PSE 1 in FIGS. 9A-9C) corresponding to a baseline utilization category 59 of aircraft 10. FIG. 9B shows tasks A, B and C that may be part of a predetermined maintenance program 58 (i.e., Program 2) for structural element 21 corresponding to a light utilization category 59 of aircraft 10. Since the utilization category for Program 2 is determined to cause less fatigue damage (e.g., slower crack growth rate) than the utilization category of Program 1, some tasks from Program 1 have been deemed not necessary in Program 2. Another way to view FIG. 9B is that one or more tasks from Program 1 corresponding to the baseline utilization category 59 may be shifted to a later time in the life cycle of aircraft 10, resulting in fewer tasks needing to be performed over the operating life of aircraft 10. FIG. 9C shows tasks A and B that may be part of a predetermined maintenance program 58 (i.e., Program 3) for structural element 21 corresponding to a super-light utilization category of aircraft 10. Since the utilization category for Program 3 is determined to cause less fatigue damage than the utilization category of Program 2, one or more tasks of Program 2 have been deemed not necessary in Program 3. In some situations, Programs 1-3 may additionally comprise maintenance-related tasks not identified in FIGS. 9A-9C that may be conducted at mid-life. In some circumstances, Program 2 and Program 3 may comprise one or more tasks from Program 1 that have been shifted to the mid-life inspection, which may be a mandatory inspection, so as to reduce the number of instances where aircraft 10 needs to be grounded for inspection/maintenance purposes.

Figure 10A:
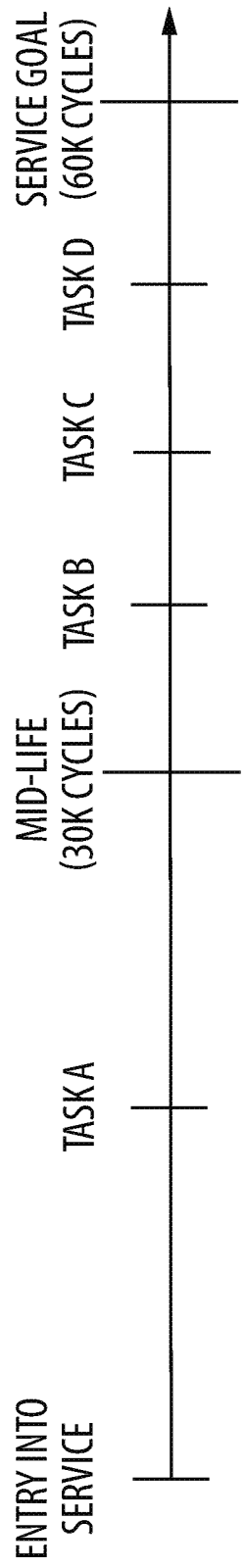
FIGS. 10A-10B are timelines that respectively illustrate exemplary maintenance programs associated with a first structural element of an aircraft for two different utilization categories for the aircraft.
Figure 10B:
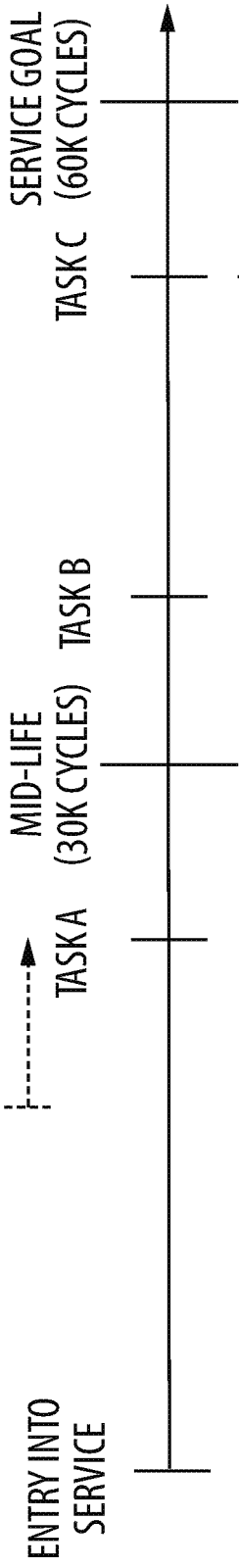
Figure 10C:
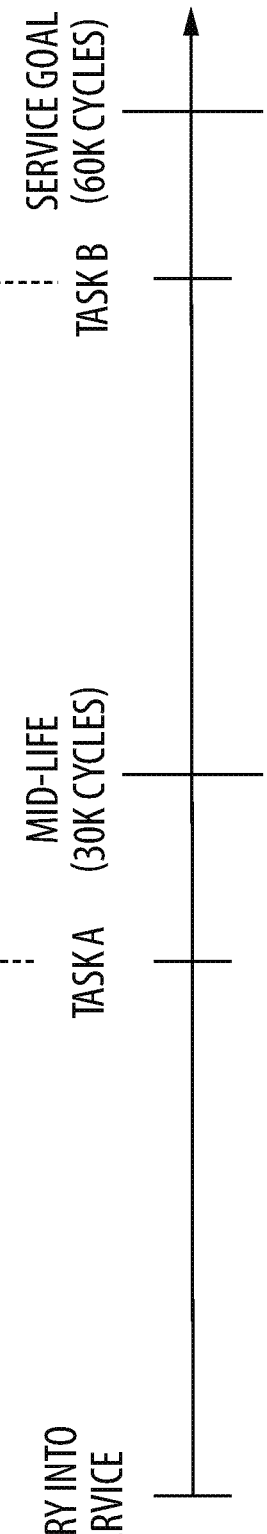
FIG. 10C is a timeline that illustrate an exemplary maintenance program associated with a second structural element of the aircraft for a utilization category for the aircraft corresponding to the utilization category of FIG. 10B.

FIGS. 10A and 10B are timelines that respectively illustrate exemplary maintenance programs 58 associated with a first structural element 21 (PSE 1) of aircraft 10 for two different utilization categories (i.e., baseline and light) for aircraft 10. In this particular example, Program 2 includes Task A that is postponed in relation to Task A of Program 1 and Program 2 also omits Task D that is part of Program 1. FIG. 10C is a timeline that illustrates an exemplary maintenance program 58 associated with a second structural element 21 (PSE 2) of aircraft 10 for a Light utilization category which is the same utilization category associated with Program 2 of FIG. 10B. Task A in Program 2 of FIG. 10B may substantially coincide with Task A in Program 2 of FIG. 10C. Here the term "substantially" is used to modify the coincidence of Tasks A from FIGS. 10B and 10C because even though the scheduled times for each of Tasks A may not be exactly the same, they may be close enough so that an operator of aircraft 10 would be inclined to have them both performed during the same maintenance session. For example, in the event where the performance of both Tasks A would require aircraft 10 being temporarily taken out of service, an operator of aircraft 10 may prefer having both Tasks A from FIGS. 10B and 10C performed during the same maintenance session instead of having to take aircraft 10 out of service twice to have each Task A performed separately.

Accordingly, as illustrated in FIGS. 10A-10C, it may be possible to adjust the utilization of aircraft 10 so that one or more future maintenance tasks associated with the first structural element 21 (PSE 1) may substantially coincide with one or more future maintenance tasks associated with the second structural element 21 (PSE 2) or with one or more other maintenance activities on aircraft 10 to reduce down time. For example, FIG. 10C shows Task A of PSE 2 substantially coinciding with Task A of PSE 1 in FIG. 10B and Task B of PSE 2 substantially coinciding with Task C of PSE 1 in FIG. 10B when aircraft 10 is operated in accordance with the Light utilization category 59.

According to another embodiment, apparatus 38 may be configured to assist with maintenance of one or more structural elements 21 of aircraft 10 where the one or more structural elements 21 or aircraft 10 as a whole already have a first predetermined maintenance program 58 assigned thereto. In reference to apparatus 38 shown in FIG. 2, memory 48 may comprise: data representative of an identification 60 of structural element 21; data representative of an identification 62 of aircraft 10; data representative of an identification of a first predetermined maintenance program 58 assigned to the identification 60 of structural element 61 or to aircraft identification 62; data representative of utilization criterion 54 associated with a second predetermined maintenance program 58 for structural element 21; data representative of an identification of the second predetermined maintenance program 58 associated with utilization criterion 54; and instructions 52 executable by processor 46.

Instructions 52 may be configured to cause processor 46 to, using actual utilization data 36 and the data representative of utilization criterion 54, evaluate actual utilization data 36 with respect to utilization criterion 36 and determine whether actual utilization data 36 meets utilization criterion 54. If actual utilization data 36 meets utilization criterion 54, processor 46 may be caused to replace the first predetermined maintenance program identification assigned to structural element identification 60 or to aircraft identification 62 with the second predetermined maintenance program identification. Processor 46 may be also caused to generate output data 50 representative of the second predetermined maintenance program identification being assigned to the structural element identification 60 or to aircraft identification 62. In some embodiments, output data 50 may be based on data of the form shown in FIG. 7A and/or FIG. 7B.

Evaluating actual utilization data 36 with respect to utilization criterion 54 may, for example, comprise comparing one or more parameters of actual utilization data 36 to corresponding one or more utilization parameters that may be part of utilization criterion 54. Alternatively or in addition, the evaluation may comprise using actual utilization data 36 to identify a mission type for aircraft 10 so as to determine whether such mission type is in accordance with utilization criterion 54. For example, the evaluation of actual utilization data 36 may comprise identifying a mission distribution of the type shown in FIG. 5 so as to determine whether the actual mission distribution is in accordance with utilization criterion 54. Determining whether the second predetermined maintenance inspection program 58 is appropriate for structural element 21 may comprise determining whether actual utilization data 36 of aircraft 10 is indicative of the utilization of aircraft 10 being within a utilization category 59 associated with the second predetermined maintenance program 58.

Depending on whether or not second predetermined maintenance program 58 is determined to be appropriate based on the actual utilization of aircraft 10, apparatus 38 may generate output data 50 representative of recommended utilization that may be useful to an operator of aircraft 10. For example, instructions 52 may be configured to cause processor 46 to generate output data 50 representative of recommended utilization of aircraft 10 to permit keeping the first predetermined maintenance program assigned to structural element 21 or to aircraft 10 as a whole. Alternatively or in addition, instructions 52 may be configured to, if the second predetermined maintenance program 58 is determined not to be appropriate for structural element 21 or to aircraft 10 as a whole, cause processor 46 to generate output data 50 representative of recommended utilization of aircraft 10 to render the second predetermined maintenance program 58 appropriate for structural element 21 or to aircraft 10 as a whole. As explained above, the recommended utilization of aircraft 10 may be in the form of one or more utilization parameters to conform to by aircraft 10.

According to another embodiment, apparatus 38 may be configured to assist with maintenance of structural element 21 of aircraft 10 where structural element 21 or aircraft 10 as a whole already has a first predetermined maintenance program 58 associated therewith. In reference to apparatus 38 shown in FIG. 2, memory 48 may comprise: data representative of an identification 62 of aircraft 10; data representative of an identification 60 of structural element 21; data representative of an identification of a first predetermined maintenance program 58 assigned to structural element identification 60 or to aircraft identification 62; data representative of utilization criterion 54 associated with a second predetermined maintenance program 58 for structural element 21 or aircraft 10 as a whole; data representative of an identification of the second predetermined maintenance program 58 associated with utilization criterion 54; and machine-readable instructions 52 executable by processor 46.

Instructions 52 may be configured to cause processor 46 to, using actual utilization data 36 and the data representative of utilization criterion 54, evaluate actual utilization data 36 with respect to utilization criterion 54 and determine whether actual utilization data 36 meets utilization criterion 54. If actual utilization data 36 does not meet utilization criterion 54, processor 46 may be caused to generate data representative of recommended utilization for aircraft 10 configured to cause future utilization data to meet utilization criterion 54. Processor 46 may also be caused to generate output data 50 representative of the recommended utilization being assigned to aircraft identification 62. In some embodiments, output data 50 may be based on data of the form shown in FIG. 8.

Evaluating actual utilization data 36 with respect to utilization criterion 54 may comprise determining whether actual utilization data 36 of aircraft 10 is indicative of the utilization of aircraft 10 differing from a utilization category 59 associated with the second predetermined maintenance program 58. Accordingly, output data 50 may be representative of recommended utilization of aircraft 10 that would render the second predetermined maintenance program 58 appropriate for structural element 21.

Alternatively or in addition, output data 50 may be representative of recommended utilization of aircraft 10 that would permit keeping the first predetermined maintenance program 58 for the structural element 21. In such situation, memory 48 may comprise data representative of utilization criterion 54 associated with the first predetermined maintenance program 58. Instructions 52 may be configured to cause processor 46 to generate output data 50 representative of recommended utilization of aircraft 10 configured to cause the future utilization data to meet utilization criterion 54 associated with the first predetermined maintenance program 58.

As explained above, in various embodiments, apparatus 38 may be configured to validate one or more design assumptions 56 used for designing structural element 21 of aircraft 10. In reference to apparatus 38 shown in FIG. 2, memory 48 may comprise data representative of one or more design assumptions 56 used for designing structural element 21 and instructions 52 executable by processor 46. Instructions 52 may be configured to cause processor 46 to: using actual utilization data 36 and the data representative of design assumption 56, evaluate actual utilization data 36 with respect to design assumption 56 and assign an indication of validity to design assumption 56. Instructions 52 may also cause processor 46 to generate output data 50 representative of the indication of validity being assigned to design assumption 56.

FIG. 11 is a table illustrating another structure of data that may be stored in memory 48 of apparatus 38. The data shown in FIG. 11 may comprise, for each identification 60 of structural element 21, one or more design assumptions 56 used in the design of the associated structural element 21. Each design assumption 56 may be associated with a unique assumption identification The one or more design assumptions 56 may each comprise one or more theoretical utilization parameters of aircraft 10 and/or mission type(s) of aircraft that were used during the design of structural element 21. Accordingly, the availability of actual utilization data 36 may permit such design assumptions 56 to be validated. In some embodiments, evaluating actual utilization data 36 with respect to design assumption 56 may, for example, comprise comparing an actual utilization parameter to the corresponding theoretical utilization parameter that was used during the design of structural element 21. In order to validate such design assumptions 56, it may be desirable to obtain actual utilization data 36 from a number of aircraft 10 of the same type. For example, it might be desirable to obtain data from one or more fleets of aircraft 10 in some situations so as to obtain an average and/or other statistically significant actual utilization data 36.

FIG. 12 is a table illustrating another structure of data that may be stored in memory 48 of apparatus 38. The data shown in FIG. 12 may comprise, for each identification 60 of structural element 21, one or more design assumption identifications used in the design of the associated structural element 21 and an indication of validity of the associated design assumption(s) 56.

The validity of design assumption 56 may be represented as an indication of whether such design assumption 56 is accurate within a certain margin, not severe enough and possibly resulting in structural element 21 being underdesigned or too severe and resulting in structural element 21 being over-designed (e.g., overweight, more expensive material). In some embodiments, the validity of design assumption 56 may be represented as a quantitative indication of how far off design assumption 56 may be. For example, such quantitative indication may include a numerical difference between an actual parameter from actual utilization data 36 and a corresponding theoretical utilization parameter. The validity of such design assumptions 56 may be used to refine the design of structural element 21 to improve its performance/reliability or reduce its weight, if possible. Such design refinements may be carried out on existing aircraft 10 by replacing an existing structural element 21 if such replacement is deemed economically worthwhile and/or on new aircraft 10 of the same or other type to which actual utilization data 36 may be of relevance.

Figure 13:
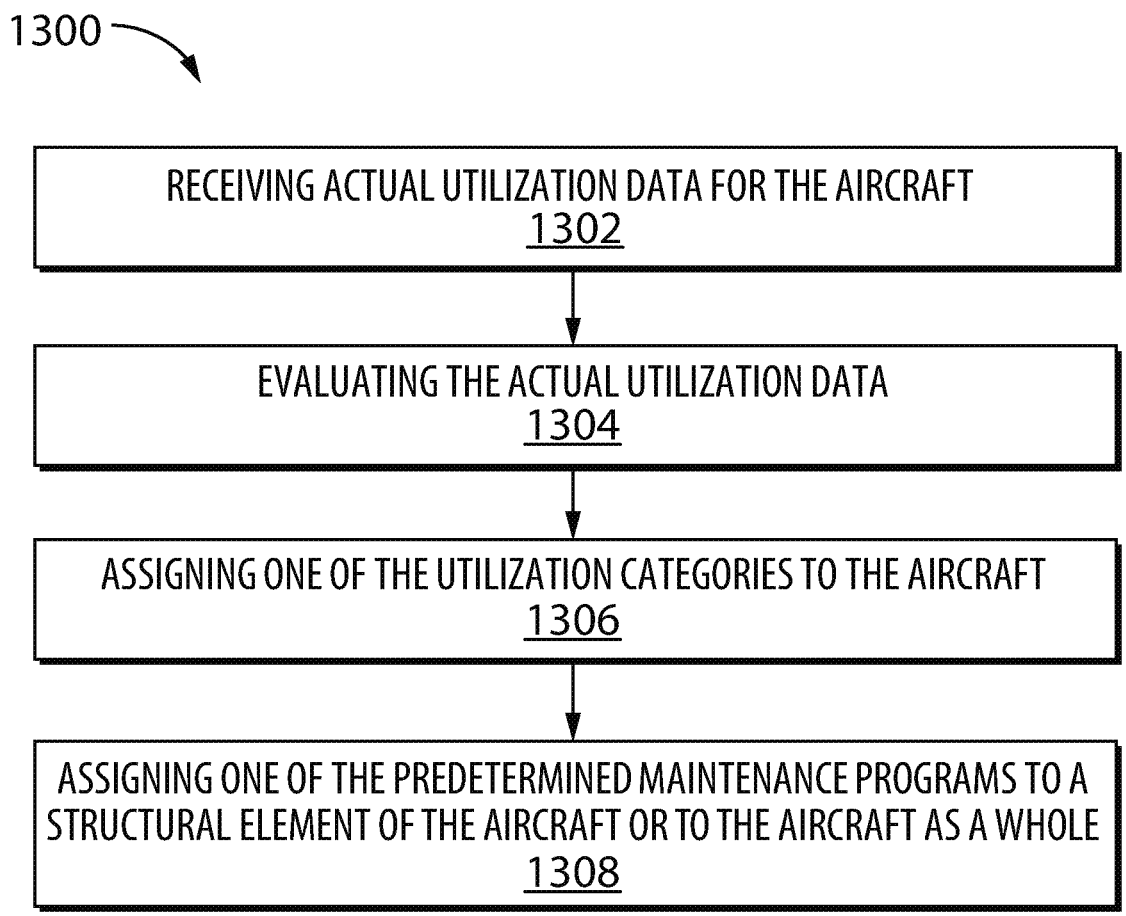
FIG. 13 shows a flowchart of an exemplary method for assisting with maintenance of a structural element of the aircraft of FIG. 1.

FIG. 13 shows a flowchart of an exemplary method 1300 for assisting with maintenance of one or more structural elements 21 of aircraft 10. At least part of method 1300 may be computer-implemented. For example, at least part of method 1300 may be performed by apparatus 38 including computer 40.

Some or all of method 1300 may be combined with one or more steps of one or more other methods disclosed herein. Method 1300 may comprise: receiving actual utilization data 36 of aircraft 10 (see block 1302); evaluating actual utilization data 36 with respect to at least one of a plurality of utilization criteria 54 respectively associated with a plurality of utilization categories 59 for aircraft 10 where utilization categories 59 for aircraft 10 are associated with predetermined maintenance programs 58 for the one or more structural elements 21 or for aircraft 10 as a whole (see block 1304); based on the evaluation of actual utilization data 36 with respect to the at least one utilization criterion 54, assigning one of the utilization categories 59 to aircraft 10

(see block 1306); and based on the assigned utilization category 59, assigning one of the predetermined maintenance programs 58 to the one or more structural elements 21 or to aircraft 10 as a whole (see block 1308).

In some embodiments, method 1300 may also comprising notifying an operator of aircraft 10 or other party of interest of the predetermined maintenance program 58 assigned to the one or more structural elements 21 of aircraft 10. For example, method 1300 may comprise communicating an identification of the assigned predetermined maintenance program 58 and/or at least part of the assigned predetermined maintenance program 58 to the operator or other party of interest.

In some embodiments, method 1300 may comprise carrying out one or more tasks of the predetermined maintenance program 58 assigned to the one or more structural elements 21 or to aircraft 10 as a whole.

Method 1300 may also comprise recommending utilization of aircraft 10 to an operator of aircraft 10 and/or to another party of interest. For example, method 600 may comprise recommending utilization of aircraft 10 that would permit keeping the assigned predetermined maintenance program 58 for structural element(s) 21 or for aircraft 10 as a whole. Alternatively or in addition, method 1300 may comprise recommending utilization of aircraft 10 that would permit replacing the assigned predetermined maintenance program 58 with another of the predetermined maintenance programs 58. For example, structural element 21 in question may be a first structural element and the other of the predetermined maintenance programs 58 may comprise a future maintenance task of the first structural element that substantially coincides with a future maintenance task of a second structural element. This may permit the maintenance tasks for both the first and second structural elements to be performed during the same maintenance session to avoid having to take aircraft 10 out of operation multiple times.

Figure 14:
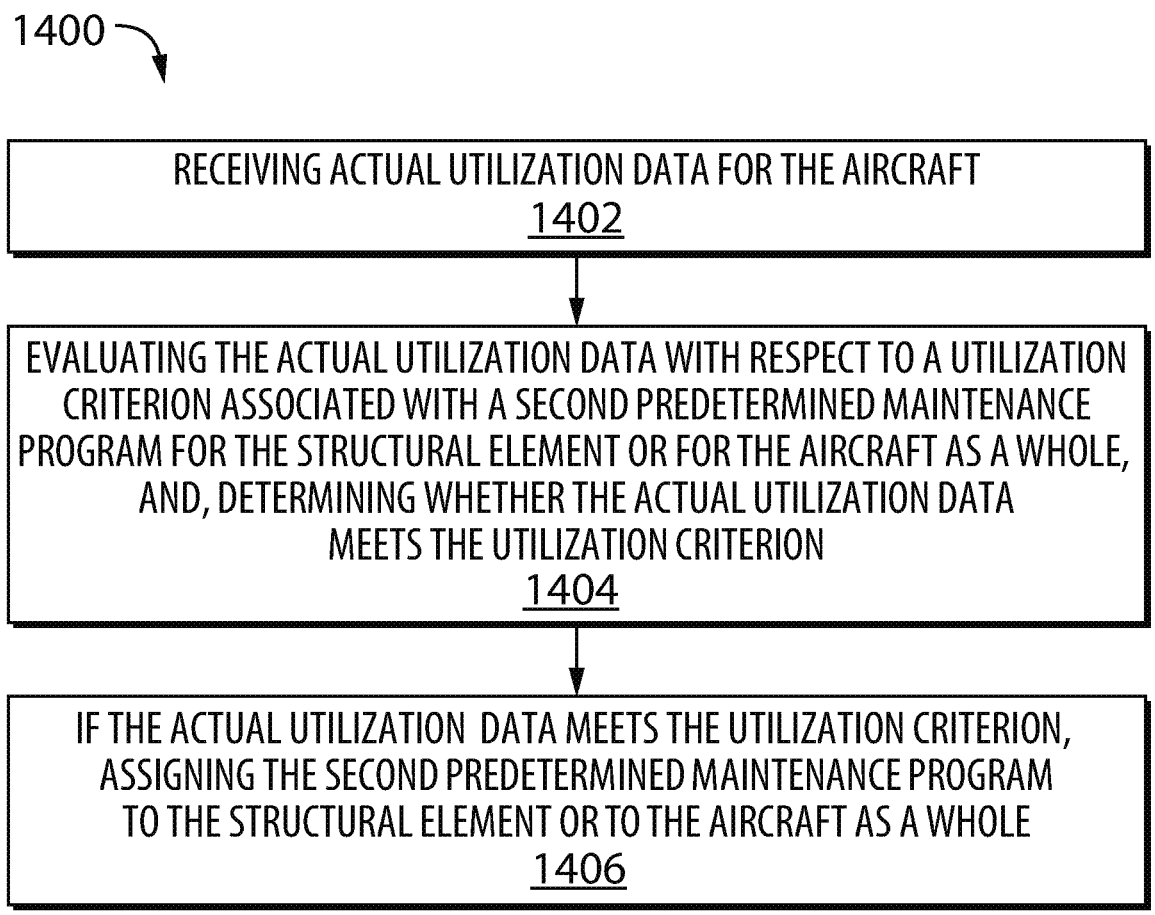
FIG. 14 shows a flowchart of another exemplary method for assisting with maintenance of a structural element of the aircraft of FIG. 1.

FIG. 14 shows a flowchart of another exemplary method 1400 for assisting with maintenance of one or more structural elements 21 of aircraft 10. Structural element(s) 21 or aircraft 10 as a whole may already have a first predetermined maintenance program 58 assigned thereto. At least part of method 1400 may be computer-implemented. For example, at least part of method 1400 may be performed by apparatus 38 including computer 40. Some or all of method 1400 may be combined with one or more steps of one or more other methods disclosed herein. Method 1400 may comprise: receiving actual utilization data 36 for aircraft 10 (see block 1402); evaluating actual utilization data 36 with respect to utilization criterion 54 associated with a second predetermined maintenance program 58 for structural element(s) 21 or for aircraft 10 as a whole and determining whether actual utilization data 36 meets utilization criterion 54 (see block 404); and if actual utilization data 36 meets utilization criterion 54, assigning the second predetermined maintenance program 58 to structural element(s) 21 or to aircraft 10 as a whole (see block 1406).

In some embodiments, method 1400 may comprise carrying out one or more tasks of the second predetermined maintenance program 58 assigned to structural element(s) 21 or to aircraft 10 as a whole.

In some embodiments, method 1400 may comprise recommending utilization of aircraft 10 to permit keeping the first predetermined maintenance program 58 assigned to structural element(s) 21 or to aircraft 10 as a whole. In some embodiments, method 1400 may comprise, if actual utilization data 36 does not meet utilization criterion 54, recommending utilization of aircraft 10 configured to cause future utilization data to meet utilization criterion 54. Alternatively or in addition, such recommendations may be made if actual utilization data 36 meets utilization criterion 54.

In some embodiments, structural element 21 may be a first structural element and the second predetermined maintenance program 58 may comprise a future maintenance task of the first structural element substantially coinciding with a future maintenance task of a second structural element of aircraft 10.

Figure 15:
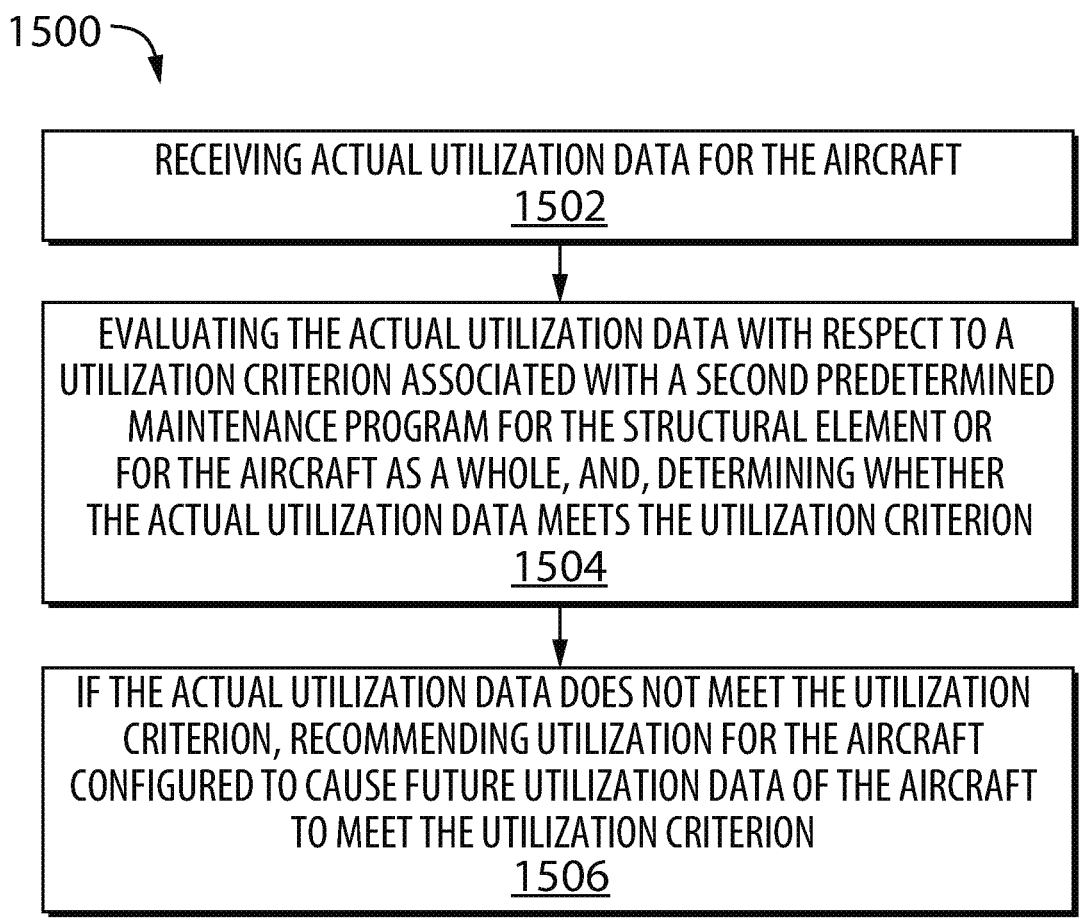
FIG. 15 shows a flowchart of another exemplary method for assisting with maintenance of a structural element of the aircraft of FIG. 1.

FIG. 15 shows a flowchart of another exemplary method 1500 for assisting with maintenance of one or more structural elements 21 of aircraft 10. Structural element(s) 21 or aircraft 10 as a whole may already have a first predetermined maintenance program 58 assigned thereto. At least part of method 1500 may be computer-implemented. For example, at least part of method 1500 may be performed by apparatus 38 including computer 40. Some or all of method 1500 may be combined with one or more steps of one or more other methods disclosed herein. Method 1500 may comprise: receiving actual utilization data 36 for aircraft 10 (see block 1502); evaluating actual utilization data 36 with respect to utilization criterion 54 associated with a second predetermined maintenance program 58 for structural element 21 or for aircraft 10 as a whole and determining whether actual utilization data 36 meets utilization criterion 54 (see block 1504); and if actual utilization data 36 does not meet utilization criterion 54, recommending utilization for aircraft 10 configured to cause future utilization data of aircraft 10 to meet utilization criterion 54 (see block 1506).

In some embodiments, method 1500 may comprise recommending utilization of aircraft 10 configured to cause the future utilization data to meet a utilization criterion 54 associated with the first predetermined maintenance program 58 assigned to structural element(s) 21 or to aircraft 10 as a whole. In some embodiment, recommended utilization may comprise a recommended distribution of mission types as illustrated in FIG. 5.

Figure 16:
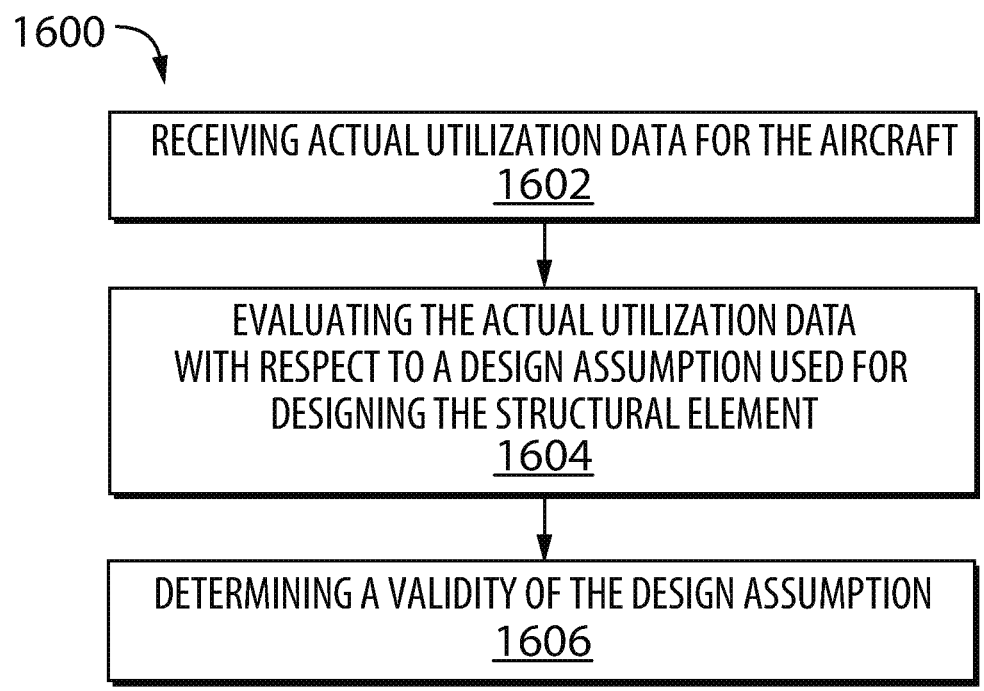
FIG. 16 shows a flowchart of another exemplary method for assisting with the design of a structural element of the aircraft of FIG. 1.

FIG. 16 shows a flowchart of another exemplary method 1600 for assisting with the design of one or more structural elements 21 of aircraft 10. At least part of method 1600 may be computer-implemented. For example, at least part of method 1600 may be performed by apparatus 38 including computer 40. Some or all of method 1600 may be combined with one or more steps of one or more other methods disclosed herein. Method 1600 may comprise: receiving actual utilization data 36 for aircraft 10 (see block 1602); evaluating actual utilization data 36 with respect to design assumption 56 used for designing structural element 21 (see block 1604); and based on the evaluation of actual utilization data 36 with respect to design assumption 56, determining a validity of design assumption 56 (see block 1606).

As explained above, the validity of design assumption 56 may be represented as an indication of whether such design assumption 56 is accurate, not severe enough or too severe. The validity of such design assumptions 56 may be used to refine the design of structural element 21 to improve its performance/reliability or reduce its weight, if possible. Accordingly, method 1600 may comprise refining a design of structural element 21. In some circumstances, method 1600 may comprise replacing an existing structural element 21 of an existing aircraft 10 by another structural element 21 having a modified design based on the validity of design assumption 56 determined via method 1600.

Alternatively or in addition, the validity of such design assumptions 56 may be used to make adjustments to one or more maintenance programs associated with one or more structural elements 21 and/or one or more aircraft 10.

Alternatively or in addition, the validity of such design assumptions 56 may be used to assign a predetermined maintenance program to one or more structural elements 21 or to one or more aircraft 10.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The present disclosure may be embodied in other specific forms without departing from the subject matter of the claims. Also, one skilled in the relevant arts will appreciate that while the apparatus and methods disclosed and shown herein may comprise a specific number of elements/components, the apparatus and methods could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An apparatus for assisting with maintenance of a plurality of structural elements of an aircraft, the apparatus comprising:
    an input interface for receiving actual utilization data for the aircraft;
    a data processor; and
    machine-readable memory coupled to the data processor, the machine-readable memory comprising:
        data representative of an identification of the aircraft;
        data representative of a plurality of utilization criteria respectively associated with a plurality of utilization categories for the aircraft;
        data representative of identifications of a plurality of predetermined structural maintenance programs for the aircraft and respectively associated with the utilization criteria; and
        machine-readable instructions executable by the processor and configured to cause the processor to:
            using the actual utilization data and the data representative of the plurality of utilization criteria, evaluate the actual utilization data with respect to at least one of the utilization criteria and assign one of the utilization categories to the aircraft identification;
            based on the assigned utilization category, assign one of the predetermined structural maintenance program identifications to the aircraft identification; and
            generate output data representative of the predetermined structural maintenance program identification being assigned to the aircraft identification,
    wherein structural elements that exhibit similar fatigue behavior are grouped into control points and the predetermined structural maintenance program is applied to said structural elements grouped within said control points.

2. The apparatus as defined in claim 1, wherein the predetermined structural maintenance programs are certified by a certification authority.

3. The apparatus as defined in claim 1, wherein the actual utilization data comprises a take-off weight.

4. The apparatus as defined in claim 1, wherein the actual utilization data comprises a flight distance.

5. The apparatus as defined in claim 1, wherein the actual utilization data comprises a flight duration.

6. The apparatus as defined in claim 1, wherein the actual utilization data comprises a landing weight.

7. The apparatus as defined in claim 1, wherein the machine-readable instructions are configured to cause the processor to generate output data representative of recommended utilization of the aircraft to permit keeping the predetermined structural maintenance program assigned to the aircraft identification.

8. The apparatus as defined in claim 1, wherein the machine-readable instructions are configured to cause the processor to generate output data representative of recommended utilization of the aircraft to permit replacing the predetermined structural maintenance program identification assigned to the aircraft identification with another of the predetermined structural maintenance program identifications.

9. The apparatus as defined in claim 7, wherein the recommended utilization comprises a take-off weight.

10. The apparatus as defined in claim 7, wherein the recommended utilization comprises a flight duration.

11. The apparatus as defined in claim 7, wherein the recommended utilization comprises a landing weight.

12. The apparatus as defined in claim 1, wherein:
    the machine-readable memory comprises data representative of a design assumption used for designing the plurality of structural elements; and
    the machine-readable instructions are configured to cause the processor to:
    using the data representative of the design assumption and the actual utilization data, evaluate the actual utilization data with respect to the design assumption and generate output data representative of a validity of the design assumption.

13. The apparatus as defined in claim 1, wherein the data representative of at least one of the utilization criteria is representative of a distribution of mission types for the aircraft.

14. The apparatus as defined in claim 1, wherein:
    the machine-readable memory comprises data representative of an identification of the plurality of structural elements of the aircraft; and
    assigning one of the predetermined structural maintenance program identifications to the aircraft identification comprises assigning the predetermined structural maintenance program identification to the structural element identification.

15. The apparatus as defined in claim 1, wherein the actual utilization data is obtained from an onboard apparatus capable of recording actual utilization data relating to aircraft utilization parameters.

16. A method for assisting with maintenance of a plurality of structural elements of an aircraft, the method comprising:
    receiving actual utilization data for the aircraft;
    evaluating the actual utilization data with respect to at least one of a plurality of utilization criteria respectively associated with a plurality of utilization categories for the aircraft, the utilization categories for the aircraft being associated with respective predetermined structural maintenance programs for the aircraft;

based on the evaluation of the actual utilization data with respect to the at least one utilization criterion, assigning one of the utilization categories to the aircraft; and based on the utilization category assigned to the aircraft, assigning one of the predetermined structural maintenance programs to the aircraft, wherein structural elements that exhibit similar fatigue behavior are grouped into control points and the predetermined structural maintenance program is applied to said structural elements grouped within said control points.

17. The method as defined in claim 16, comprising carrying out the predetermined structural maintenance program assigned to the aircraft.

18. The method as defined in claim 16, wherein the predetermined structural maintenance programs are certified by a certification authority.

19. The method as defined in claim 16, wherein the actual utilization data comprises a take-off weight.

20. The method as defined in claim 16, wherein the actual utilization data comprises a flight distance.

21. The method as defined in claim 16, wherein the actual utilization data comprises a flight duration.

22. The method as defined in claim 16, wherein the actual utilization data comprises a landing weight.

23. The method as defined in claim 16, comprising recommending utilization of the aircraft to permit keeping the predetermined structural maintenance program assigned to the aircraft.

24. The method as defined in claim 16, comprising recommending utilization of the aircraft to permit replacing the predetermined structural maintenance program assigned to the aircraft with another of the predetermined structural maintenance programs.

25. The method as defined in claim 24, wherein the other predetermined structural maintenance program comprises a future maintenance task of a first structural element substantially coinciding with a future maintenance task of a second structural element.

26. The method as defined in claim 23, wherein the recommended utilization comprises a take-off weight.

27. The method as defined in claim 23, wherein the recommended utilization comprises a flight duration.

28. The method as defined in claim 23, wherein the recommended utilization comprises a landing weight.

29. The method as defined in claim 16, wherein each of the predetermined structural maintenance programs comprises an inspection schedule.

30. The method as defined in claim 16, comprising evaluating the actual utilization data with respect to a design assumption used for designing the plurality of structural elements and determining a validity of the design assumption.

31. The method as defined in claim 16, wherein one or more of the utilization criteria comprise a distribution of mission types for the aircraft.

32. The method as defined in claim 16, wherein assigning one of the predetermined structural maintenance programs to the aircraft comprises assigning the predetermined structural maintenance program to the plurality of structural elements of the aircraft.

33. The method as defined in claim 16, wherein the actual utilization data is obtained from an onboard apparatus capable of recording actual utilization data relating to aircraft utilization parameters.

* * * * *